(12) United States Patent  
Arntz

(10) Patent No.: US 8,278,776 B1  
(45) Date of Patent: Oct. 2, 2012

(54) RECIPROCATING WIND-POWERED TRANSDUCER EMPLOYING INTERLEAVED AIRFOIL ARRAYS

(76) Inventor: Floyd Arntz, Newton, MA (US)

( * ) Notice: Subject to any disclaimer, the term of this patent is extended or adjusted under 35 U.S.C. 154(b) by 0 days.

(21) Appl. No.: 13/224,853

(22) Filed: Sep. 2, 2011

Related U.S. Application Data

(60) Provisional application No. 61/465,353, filed on Mar. 18, 2011.

(51) Int. Cl.
  *F03B 13/00* (2006.01)
  *H02P 9/04* (2006.01)
(52) U.S. Cl. ....................................................... 290/54
(58) Field of Classification Search .................. 290/54, 290/55, 44, 42, 53
  See application file for complete search history.

(56) References Cited

U.S. PATENT DOCUMENTS

| | | | |
|---|---|---|---|
| 3,995,972 A | 12/1976 | Nassar | |
| 4,184,805 A | 1/1980 | Arnold | |
| 4,186,314 A | 1/1980 | Diggs | |
| 4,238,171 A | 12/1980 | Van Mechelen | |
| 4,303,835 A | 12/1981 | Bair | |
| 4,347,036 A | 8/1982 | Arnold | |
| 4,470,770 A | 9/1984 | Grose | |
| 4,915,584 A | 4/1990 | Kashubara | |
| 6,016,014 A | 1/2000 | Grigorescu et al. | |
| 6,273,680 B1 | 8/2001 | Arnold | |
| 6,918,350 B1 | 7/2005 | Morse | |
| 7,632,069 B2 | 12/2009 | Kelley | |
| 7,823,405 B2 | 11/2010 | Williams | |
| 7,892,129 B2 | 2/2011 | Lee | |
| 2003/0143072 A1 | 7/2003 | Smith, II | |
| 2007/0297903 A1* | 12/2007 | Morris | 416/132 A |
| 2008/0047271 A1 | 2/2008 | Ingersoll | |
| 2008/0148723 A1* | 6/2008 | Birkestrand | 60/327 |
| 2009/0016884 A1 | 1/2009 | Yan | |
| 2009/0121490 A1 | 5/2009 | Platzer et al. | |
| 2010/0143115 A1 | 6/2010 | Kerr | |

FOREIGN PATENT DOCUMENTS

DE  10121817 A1  11/2002
WO  2006/093790  * 9/2006

* cited by examiner

*Primary Examiner* — Javaid Nasri
(74) *Attorney, Agent, or Firm* — John H. Pearson, Jr. Esq.; Walter F. Dawson, Esq.; Pearson & Pearson, LLP.

(57) ABSTRACT

A reciprocating transducer to convert windpower to electrical energy includes an odd sub-array of blades and an even sub-array of blades, wherein two odd thrust rods are pivotably coupled to the ends of each of the odd numbered blades, two even thrust rods are pivotably coupled to the ends of each of the even numbered blades, an odd tilt rod is pivotably coupled to the trailing edge of each of the odd numbered blades, an even tilt rod is pivotably coupled to the trailing edge of each of the even numbered blades. The tilt rods are moved up and down, thereby changing the attitude of the blades, a crank shaft converts the linear motion of the thrust rods into rotational motion, and a generator converts the rotational motion into electrical power.

21 Claims, 21 Drawing Sheets

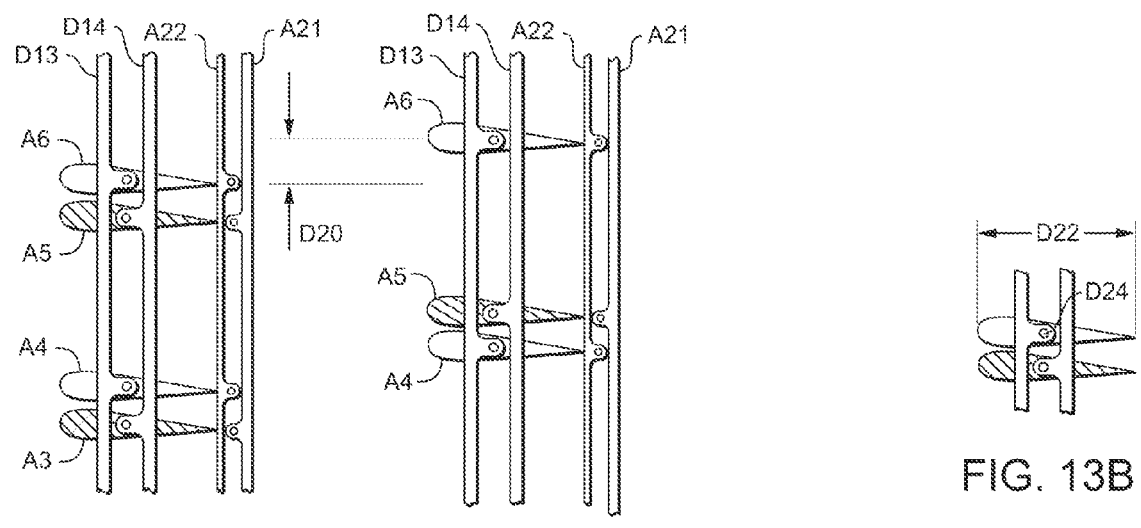
FIG. 13A
FIG. 13B
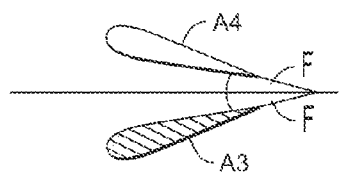
FIG. 13C

RECIPROCATING WIND-POWERED TRANSDUCER EMPLOYING INTERLEAVED AIRFOIL ARRAYS

The application claims priority based on U.S. Provisional Application No. 61/465,353.

DESCRIPTION IN VIEW OF RELEVANT ART

The present device is a reciprocating transducer designed to convert the kinetic energy in a moving fluid into electrical energy. The device is especially suited for use to convert wind into electrical power.

Prior relevant technology of this nature has emphasized the use of rotating turbines, which are presently in use in an expanding market. However, wind turbines have a number of drawbacks. They are large and expensive to operate and install, are not practical for use in connection with many types of residences, and are known to pose a danger to birds.

The present device, in contrast, can be quite compact and light-weight, and suitable for mounting on the ground, in back yards of residences, or on roof tops, as well as presenting other mounting alternatives.

Common to all the embodiments of this device are two interleaved arrays of airfoils, a shared crankshaft, and an exoskeleton with sliders which limit the reciprocating translational movements of the airfoil spars to a single plane. This plane also contains the axis of the crankshaft. This axis and the spars are all mutually parallel.

Wind powered longitudinal thrusts of the airfoil arrays impress torque upon the rotating crankshaft by use of means which include piston-rod-type linkages or Scotch Yokes, or variations described herein as "Polish Yokes".

Any of these can also be used as means to impose tilts on the arrays in order to increase the surface area of the blades exposed normal to the wind.

Common to all the embodiments, means are provided to control the tilt of each array such that the resulting wind induced forces only constructively add to rotation of the crankshaft. The means for controlling the tilts of the arrays can be purely mechanical or can involve electromechanical means, the latter allowing dynamic adjustment to wind conditions. To adjust appropriately the electromechanical means require a sensor to detect the tilt of the airfoils or, equivalently, to detect the rotary angle of the crankshaft.

Most of the embodiments described herein would mount upon either a rotatable horizontal table ("lazy susan") or a platform floating on water permitting the transducer to be oriented relative to the direction of the wind.

Other species of transducers in the relevant art employing only a single array of airfoils rely solely upon the aerodynamic physical mechanism similar to those accounting for the lift provided by airplane wings. By employing two interleaved airfoil arrays that move in opposition, one acquires opportunity to supplement or even supplant this "lift" mechanism with pneumatic effects. In the extreme case in which aerodynamics is totally supplanted the panel of airfoils can be described as a "distributed planar valve" that cycles between allowing passage of the wind with little impediment and the stalling of airflow altogether, as a function of the attack angle of the airfoil. This cyclic mechanism is called "trap and release" herein. During the "trap" portion of the cycle air pressure builds up between the blades as the trailing edges of the blades restricts the passage of air between the pairs of blades. During the "release" interval passage between the trailing edges of the pairs of blades opens, and adiabatic expansion of air performs work, much as adiabatic expansion of gas performs work in a classic Carnot engine.

The embodiments described herein are all far more easily and quickly deployed than the huge wind power turbines that presently dominate the marketplace.

Because the two nearly identical airfoil arrays move in opposition in the embodiments described herein, the transducer as a whole is inertially neutral. This is especially important for roof-top applications where vibration would be detrimental to the roof, and for kite-borne applications where control of the kite would be otherwise compromised.

None of the embodiments described herein requires the use of space age materials. Except for a few components (e.g. ball bearings or bushings, and electric generators) most third world countries have domestic materials suitable for their construction. However, materials such as carbon fiber for use in the airfoils would further enhance the operation of said devices.

Although most of the embodiments presented herein involve the use of single-piece symmetric blades there is a subset which employ articulated airfoils. This is of interest because it is generally understood in the flight community that articulated airfoils can exhibit more than twice the lift (positive and negative) than comparable symmetric single-piece airfoils when Bernoulli effect, rather than pneumatic conditions, apply.

This family of interleaved, reciprocating array transducers includes the following generators of power: land-based wind converters, roof-top wind converters, ship-based wind converters, airborne (kite/balloon) suspended converters, tidal converters, flowing stream converters, and a wave converter based upon cyclic lift and drop of a horizontal panel tethered beneath a bobbing float.

DISCUSSION OF THE RELATED ART

It is feasible to construct an oscillating wing power generator for the purpose of extracting useful power from a fluid flow. In 1981, McKinney and DeLaurier built such a device at the University of Toronto which they described in the Journal of Energy, Vol. 5, No. 2, pp. 109-115, "The Wingmill: An Oscillating-Wing Windmill". It consists of a horizontally mounted wing whose plunging motion is transformed into a rotary shaft motion. The wing is pivoted to pitch at its half-chord location by means of a fitting which is rigidly attached to the vertical support shaft. Also fixed to the support shaft is the outer sleeve of a push-pull cable whose end pivots on a wing-fixed lever to control the wing's pitch. The up-and-down motion of the support shaft is transformed, through a Scotch-yoke mechanism, into a rotary motion of a horizontal shaft. This shaft, in turn, operates a crank at its far end which actuates the previously mentioned pitch-control cable. Hence the wing's pitching and plunging motions are articulated together at a given frequency and phase angle. Wind tunnel tests of this device showed that this type of power generator is capable of converting wind energy into electricity with an efficiency approaching that of conventional windmills.

In recent years, K. D. Jones, S. T. Davids, M. F. Platzer and K. D. Jones, K. Lindsey, M. F. Platzer built similar wingmills for use in water flows which they described in the Proceedings of the 3rd ASME/JSME Joint Fluids Engineering Conference, San Francisco, July 1999 and in the Proceedings of the Second International Conference on Fluid Structure Interaction II, WIT Press 2003, pp. 73-82, respectively. They showed that this type of power generator is capable of converting water flow energy into electricity. Furthermore, the company Engineering Business Ltd in Riding Mill, Northumberland, England, built and tested an oscillating-wing hydropower generator, called "Stingray", which produced an output of 150 kW. They also performed computations which showed that optimum power extraction performance requires large plunge amplitudes (of the order of the wing chord) and large pitch angles (70 to 80 degrees).

Recently, O. J. Birkestrand's application for a "fluid-responsive oscillation power generation method and apparatus" was published on 26 Jun. 2008 in U.S. 2008/0148723. In this device an airfoil is mounted on a shaft such that the airfoil can be excited into a pitch oscillation about an axis at or close to the leading edge by actuating a trailing-edge flap. D.C. Morris' international patent application WO 2006/093790 for an "oscillating fluid power generator" was published on 8 Sep. 2006. He, too, proposes the use of a single or multi-element airfoil which pivots about a vertical mast. These recent devices overlook the need for a large amplitude oscillatory plunge motion (typically of the order of one wing chord length) in order to achieve optimum performance.

Nassar (U.S. Pat. No. 3,995,972) and Kashubara (U.S. Pat. No. 4,915,584) in their respective patents also exploited reciprocating blade means for conversion of the kinetic energy of flowing air and water into useful forms of energy. Nassar specifically refers to a plurality of blades having their tilt controlled by external means, whereas Kashubara introduces a trip mechanism to reverse the tilt of a blade at each extreme of its motion.

Arnold, in a succession of patents (U.S. Pat. No. 4,184,805, U.S. Pat. No. 4,347,036, U.S. Pat. No. 6,273,680) and recently Kerr (US 2010/0143115) invoke the use of arrays of blades to extract energy from flowing air and water, but they explicitly rely upon the spontaneous occurrence of an aeroelastic "flutter" phenomenon to interrelate the blade tilts and blade translations for generating useful power, rather than providing for explicit control of the tilt of the blade or blades.

Arnold in his patents introduces use of interleaved blade arrays moving in opposition as a possibility but describes their movement entirely in terms of the spontaneous "flutter" phenomenon. Furthermore in his claims he asserts each blade is positioned between parallel plates and prior to the onset of flutter the blade is parallel to the airflow when in the neutral center between these plates.

Furthermore, Arnold specifically attempts to reduce or eliminate lift forces acting upon his "airfoils" by using a symmetrical profile in the design of these "airfoils". See Arnold, U.S. Pat. No. 4,184,805 p4/lns 15-20. "Each airfoil preferably has a rounded leading edge and a sharp trailing edge, has a large aspect ratio, has a symmetrical profile, i.e. has zero camber to reduce the lift force, and is rectangular in plan form."

The present design, in contrast, uses articulated airfoils to create greater lift in one of the main embodiment, thereby increasing the efficiency and power production of the present device. In other embodiments, the "trap and release" effect is used to drive the blades apart. Furthermore, all of the embodiments of the present device use synchronized motion of opposing blades in reciprocating fashion, analogous to the operation of the internal combustion engine, rather than the random "flutter" effect of the Arnold patents.

The above examples of relevant art concern the use of individual blades, and in some cases interlinked pairs or arrays of these, which translate in response to flow of a motive medium. With the exception of the examples of Arnold and Kerr, none of these suggest use of interleaved arrays of blades translating cyclically in opposition in response to the flow of the motive medium while subject to the explicit control of blade tilts. Arnold and Kerr, on the other hand, exclusively invoke a spontaneous phenomenon to interrelate blade tilt and movement.

The subject device is a novel transducer for converting the kinetic energy of a fluid into useful energy. In one orientation this transducer can be described as follows: it is comprised of two interleaved arrays of airfoils or hydrofoils, or flat panels ("blades") which ascend and descend cyclically in opposition, and are linked to a shared horizontal axis crankshaft. The spars about which the airfoils tilt are parallel to the crankshaft axis and together with it collectively occupy a single plane. The spars are precisely positioned between the leading edges and trailing edges of the airfoils to ensure that the overall torque imparted to them by the wind is readily overcome by applied torque. This ensures that the energy per cycle required to controllably tilt the blades is substantially less than the energy per cycle realized from the vertical thrust associated with the alternating plunging and soaring of the arrays. The opposing synchronized translations and tilts of adjoining airfoils can be adjusted to introduce a valve-like (pneumatic) effect that can substantially increase power yield. In the following, descriptions are expressed in aerodynamic and pneumatic terms for convenience, but should be understood as generally applying to hydrodynamic and hydraulic conditions as well. Specifically, the word "airfoil" is intended to serve as proxy for "hydrofoil" and the word "aerodynamic" is intended to serve as proxy for "hydrodynamic".

The two interleaved arrays are linked to opposing crank pins on the crankshaft and hence can only move reciprocally in absolute synchronism. The tilts of the two arrays are imposed and maintained in synchronism by means related to the vertical motion of the airfoils or rotation of the crankshaft. The crankshaft is essential; it bears and balances the weight of the arrays, it ensures their translations are opposite, and it serves as mechanical reference for the control of the tilts of the arrays.

This device depends upon—and greatly benefits from—continuous control of the tilts of the interleaved airfoil arrays. This control is designed to ensure the airfoils reciprocate in proper opposition for producing useful power in response to wind.

The term "airfoil" used herein may suggest that Bernoulli's principles explaining lift and drag of aircraft wings properly accounts for the forces impressed upon the airfoil arrays. Indeed, simple application of Bernoulli's principles may apply when the blades are approximately midway in their transit between extremes and are most distant from one another. As the blades approach one another one may consider invoking aerodynamic analysis applicable to the biplane, but this is not applicable because in this case nearest neighbor blades are tilted in opposition and are converging with their nearest neighbors. Furthermore, in the extreme, momentarily the airflow may be blocked altogether. This transitory process might be called "trap and release" which invites description in terms of pneumatics, specifically adiabatic compression and expansion which are portions of the thermodynamic Carnot cycle, rather than in terms of Bernoulli's principle.

Although the description herein generally refers to transducers comprised of arrays of horizontal airfoils with a horizontal crankshaft below basically constituting a vertical panel, a "fence" version with these axes oriented vertically also constitutes a desirable embodiment of the device. In this case a single vertical crankshaft might be centered with two opposing-movement arrays on one side and two opposing-movement arrays on the other, but which is engaged with and serves both sides. A fixed-azimuth "fence" variant would be particularly suitable for mounting upon the perimeters of roofs of industrial buildings. In addition to providing electrical power or driving reciprocating heat pumps they would conceal from view unattractive industrial heat exchanger facilities and exhaust fans typically installed there.

It is convenient to compare operation of this transducer to the operation of a two-cylinder, two-stroke, in-line internal combustion (IC) engine. Instead of power being produced by combustion of hydrocarbon fuel in an IC engine, wind is the source of forces delivering power to the crankshaft. In this transducer the two airfoil arrays are analogous to the pistons of a two cylinder IC engine. And, as in the IC engine, thrust is transferred to the crankshaft via rods with bearings or bushings at both ends, or transferred by a Scotch-yoke (crank-and-slider) means. A significant difference between this transducer and the IC engine is that for each airfoil array both strokes comprising a full single cycle impart power to the load whereas in a two-stroke IC engine only one stroke is a power stroke, the other is a power-consuming compression stroke.

Control of blade array tilt, requiring low power as noted above, may be accomplished by mechanical, electromechanical or pneumatic means or some combination of these three technologies. Examples are presented herein.

It is assumed generally for wind power applications that this transducer would be mounted upon a platform that rotates azimuthally about a vertical axis permitting orientation of the transducer (a "panel") relative to the prevailing wind for maximizing the power yield and, when storm conditions are extreme, to present a minimal cross-section to the wind. An important exception is when the transducer is suspended from a kite, a balloon or a combination of the two. In this case the transducer would be spontaneously oriented relative to the local wind by the suspending means but, when necessary, it would be protected from severe weather conditions by returning it to earth.

Note for all embodiments of this device injury to birds can readily be prevented by mounting a protective screen in front of the upwind face of the transducer.

Regardless of whether the transducer is airborne or not, the weight of the moving mechanisms should generally be minimized consistent with strength and reliability criteria. The heaviest components would likely be the crankshaft (made of titanium-aluminum alloy) and the electrical generator, if present. The blades would best be light, especially for the airborne embodiment of the transducer. Like the wings of the earliest aircraft and the wings of present day glider aircraft, the airfoils would be constructed of light but strong structural members and fabric skins. Modern day structural elements would be produced by extrusion of thermoplastics and carbon-fiber tubing, and the airfoil skin might be resin-impregnated woven carbon-fiber. Sailcloth and synthetic polymeric fabrics used for paragliding sails and parachutes would also be suitable. Preferably the moving rods would also be light. These would likely be made of titanium-aluminum alloy or carbon fiber tubes. Use of steel or bronze bearings, bushings, or flexible metal linkages would be desirable at every hinge point. The passive exoskeleton framework for the land-based embodiments can be made of conventional steel, plastic, wooden or composite materials but for the airborne version the use of carbon-fiber or specialty high-strength, low-density, polymers would be preferred. In most cases the airfoil skins, regardless of material, would need to be protected by ultraviolet tolerant coatings. Fortunately, except perhaps for low friction hinges and the electric generator, citizens of third world countries could build productive versions of this power source using only local materials. Of course, hydrodynamic versions of this device would require the use of materials appropriate for underwater use. For these weight is less an issue but topside buoyancy and bottom-side ballast would need to be considered.

An important benefit afforded by this technology is the ease of its deployment. This is aided, of course, if the weight of the transducer has been minimized consistent with acceptable manufacturing costs and appropriate robustness. The basic land deployable embodiment would likely be a vertical panel two to three meters wide (6-9 feet, exceeding the span of each blade by approximately six inches), and three to four meters high (9-12 feet) that could be transported by common tractor trailers or by helicopter. The basic airborne implementation would likely be a panel one-fourth the area of the land-based embodiment. In emergency situations electric power could be available within ten minutes after delivery.

Typically the transducer would be assembled in a factory environment but it could be delivered in kit form for assembly at the point of use. The assembly process would likely proceed in the following sequence: (a) assemble the exoskeleton, (b) mount the crankshaft, (c) install the strong vertical thrust rods within the side members of the framework, (d) install the connecting rods between these and the crankshaft, (e) install the moving-pivoting tilt rod structures within the framework, (f) install and engage the tilt control means within the crankcase, and (g) attach the airfoils to the vertical thrust rods and the moving-pivoting tilt rod structures. The final step would be to mount the electric generator.

SUMMARY OF THE DEVICE

It is an object of the present device to generate electrical energy from the kinetic energy of a fluid. It is a further object to do so with a device that is light-weight and portable, and which can be disposed in a variety of locations.

In accordance with a first aspect of this device, a reciprocating transducer powered by the kinetic energy of fluids includes an array of interleaved blades which include a first set of blades and a second set of blades, wherein each member of the first set is disposed between two members of the second set, except for the blades at the two extremes.

In accordance with a second aspect of the device, it includes means for tilting the blades to a first position, so that, during a first stroke of the transducer, a leading edge of each blade of the first set is tilted upward away from a leading edge of each blade of the second set, which is tilted downward, so that the passage of the fluid causes the blades of the first set to linearly rise and the blades of the second set to linearly fall.

In accordance with a third aspect of the device, it includes means for tilting the blades to a second position so that, during a second stroke of the transducer, the leading edge of each blade of the second set is tilted upward away from the leading edge of each blade of the first set, which is tilted downward, so that the passage of the fluid causes the blades of the second set to linearly rise and the blades of the first set to linearly fall, creating linear excursions thereby.

In accordance with a fourth aspect of the device, at the end of the second stroke the blades are in the same configuration as they were at the beginning of the first stroke, which may be repeated, at a controlled, synchronized rate.

In accordance with a fifth aspect of the device means are provided for converting the linear excursions of the blades into electrical energy.

In accordance with a sixth aspect of the device, one or more first thrust rods are provided rotatably affixed to each blade of the first set and one or more second thrust rods are provided, rotatably affixed to each blade of the second set, In accordance with a seventh aspect of the device, the blades are airfoils capable of creating lift as a result of fluids flowing over their surfaces, and the angles at which they are tilted provides Bernoulli-effect forces which drive apart those blades whose leading edges are tilted away from the leading edges of adjacent blades.

In accordance with an eighth aspect of the device, an electrical generator, coupled to said rotary motion, and generating electrical power thereby, is also included.

In accordance with a ninth aspect of the device, the means to convert the linear excursions into rotary motion includes a crankshaft.

In accordance with a tenth aspect of the device the means to convert the linear excursions into rotary motion includes one or more Scotch Yokes.

In accordance with an eleventh aspect of the device the means to convert the linear excursions into rotary motion includes one or more Polish Yokes.

In accordance with a twelfth aspect of the device the fluid comprises air or water.

In accordance with a thirteenth aspect of the device the array of blades includes a plurality of odd numbered blades that make up an odd sub-array and a plurality of even numbered blades that make up an even sub-array.

In accordance with a fourteenth aspect of the device the upward thrust members include one or more odd thrust rods pivotably coupled to the ends of each of the odd numbered blades, and the downward thrust members include one or more even thrust rods pivotably coupled to the ends of each of the even numbered blades.

In accordance with a fifteenth aspect of the device the means for configuring the array alternatingly between the first and the second configurations further includes one or more odd tilt rod pivotably coupled to the trailing edge of each of the odd numbered blades and one or more even tilt rod pivotably coupled to the trailing edge of each of the even numbered blades.

In accordance with a sixteenth aspect of the device means are provided to move the tilt rods up and down, thereby changing the attitude of the blades.

In accordance with a seventeenth aspect of the device a plurality of connecting rods, each having an upper and lower end, are included, wherein each connecting rod is rotatingly affixed at its upper end to a lower end of a corresponding thrust rod, and is rotatingly affixed at its lower end to corresponding crank throws.

In accordance with a sixteenth aspect of the device the means for means for moving each of the tilt rods up and down comprises linear motor means.

In accordance with an eighteenth aspect of the device the means for moving each of the tilt rods up and down includes one or more cams.

In accordance with a nineteenth aspect of the device the blades are in the form of articulated airfoils.

In accordance with a nineteenth aspect of the device each articulated airfoil further includes a forward section, an articulation joint, and a rear section, and further providing means for tilting the forward section, and means to tilt the rear section, thereby producing the articulated airfoil shape.

BRIEF DESCRIPTION OF DRAWINGS

These and other aspects of the device are better understood by the incorporation of the following drawings, in which:

FIG. 13-A depicts a two pairs of blades at two different times during a cycle, showing the excursion of the arrays.

FIG. 13-B depicts a pair of blades, showing the chord of the blades, and the pivot point of the upper blade.

FIG. 13-C depicts a pair of blades, showing the angle of tilt.

DESCRIPTION OF THE EMBODIMENTS

Figure 1:
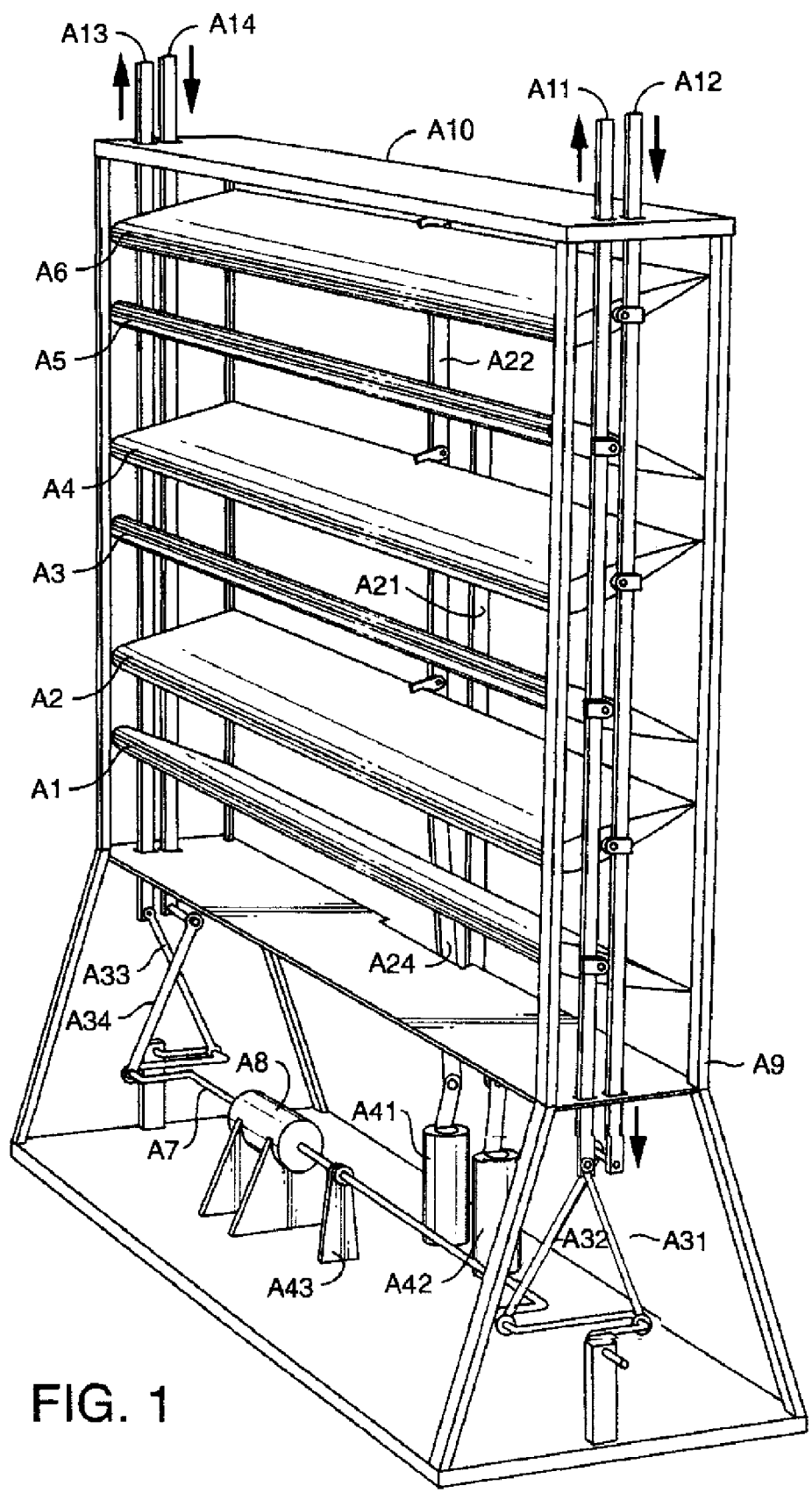
FIG. 1 depicts a perspective view, illustrating a first upright embodiment of the reciprocating airfoil array 485 wind-power transducer.

Referring first to FIG. 1, a first embodiment of the transducer, in the form of a wind-powered array, is shown.

The array includes an odd numbered set of blades (A1, A3, A5) comprise the odd sub-array, and an even numbered set of blades (A2, A4, A6) comprise the even sub-array. The blades in this embodiment are in the form of airfoils.

Figure 2:
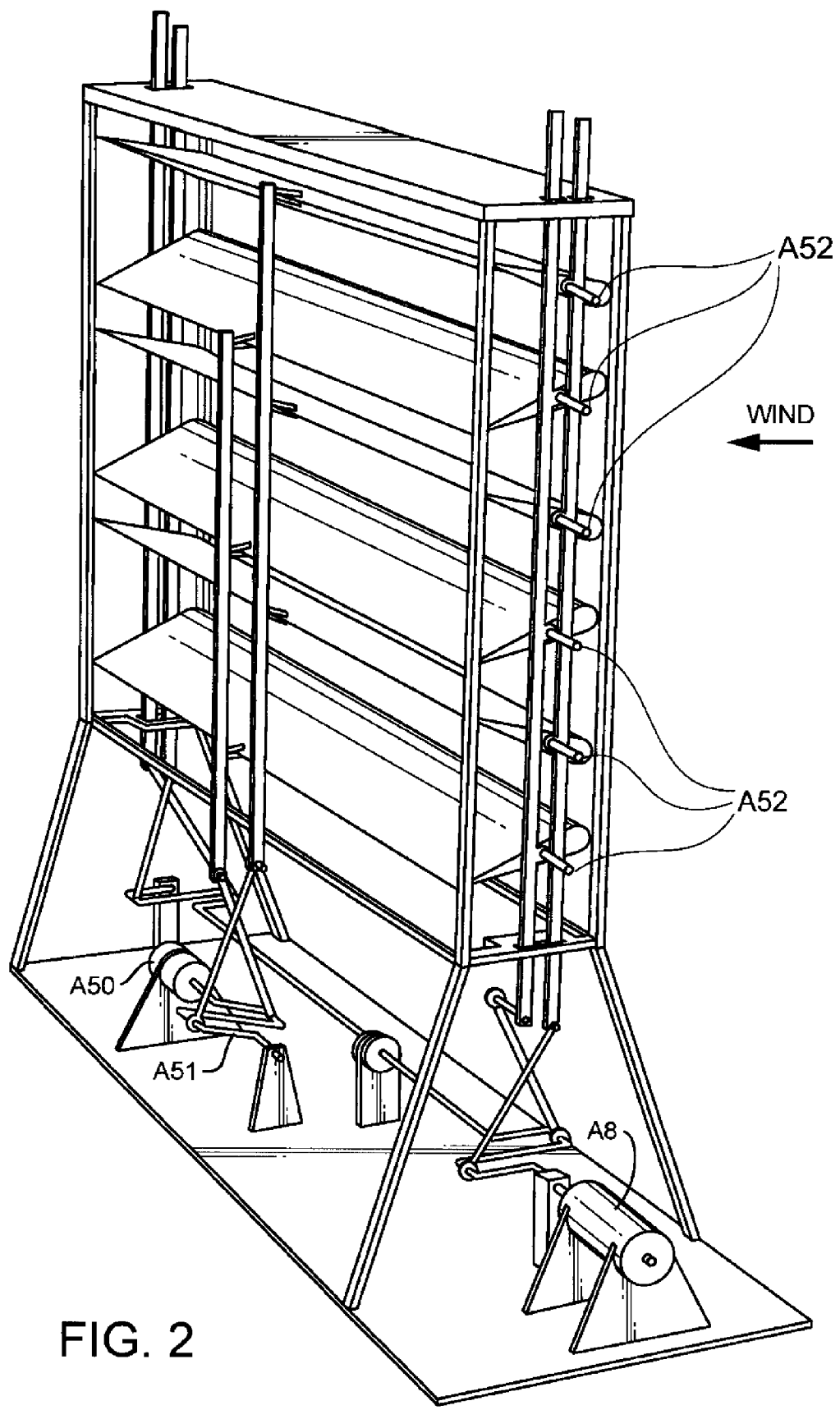
FIG. 2 depicts a perspective view, illustrating a second upright embodiment of the reciprocating array wind-power transducer.

Blades A1,A3,A5 are pivotably coupled at their ends to thrust rods A11, A13 by means of spars A52, FIG. 2, and pivotably coupled at their trailing edges to tilt rod A21. Similarly blades A2,A4,A6 are coupled at their ends to rods A12, A14, and coupled at their trailing edges to tilt rod A22.

In analogy with two-stroke in-line internal combustion engines, thrust rods A11, A13 are pivotably coupled to connecting rods A31, A33 with "wrist" bearings at one end of each, the other ends pivotably coupled to opposing crank pins on the flat crankshaft A7. Correspondingly the even numbered blades (A2, A4, A6), comprising the even blade subarray, are coupled to the crankshaft crank pins via linkages A12, A14, A32, A34. Joined structural members A9 and A10 are among the structural components which comprise an exoskeleton, providing structural support. The thrust rods A11, A12, A13, A14 are limited to vertical motion by vertical sliders mounted upon the exoskeleton.

During normal operation vertical thrust in the form of aerodynamic lift, impressed on the two arrays by wind incident on the leading edges of the arrays, impel rotation of the crankshaft, which in this case drives an interior electrical generator A8 to provide useful power. The tilts of the arrays in this embodiment are imposed by linear motors A41, A42 linked to the arrays via pivoting links A23, A24 and vertical tilt rods A21, A22. Sensor A43 provides electrical signals representing the angle of rotation of the crankshaft. This signal, together with the command signals to the linear motors A41, A42 are sufficient to determine the current airfoil tilts.

Referring next to FIG. 2, a perspective illustration of a preferred upright embodiment of the reciprocating array wind-power transducer is shown. This embodiment differs from the embodiment represented in FIG. 1 in two regards: the tilts are jointly controlled by a single electric motor A50 driving an auxiliary single flat crankshaft A51 rather than by two independent linear motors, and the electric generator A8 is located external to the main frame, or exoskeleton.

Figure 3:
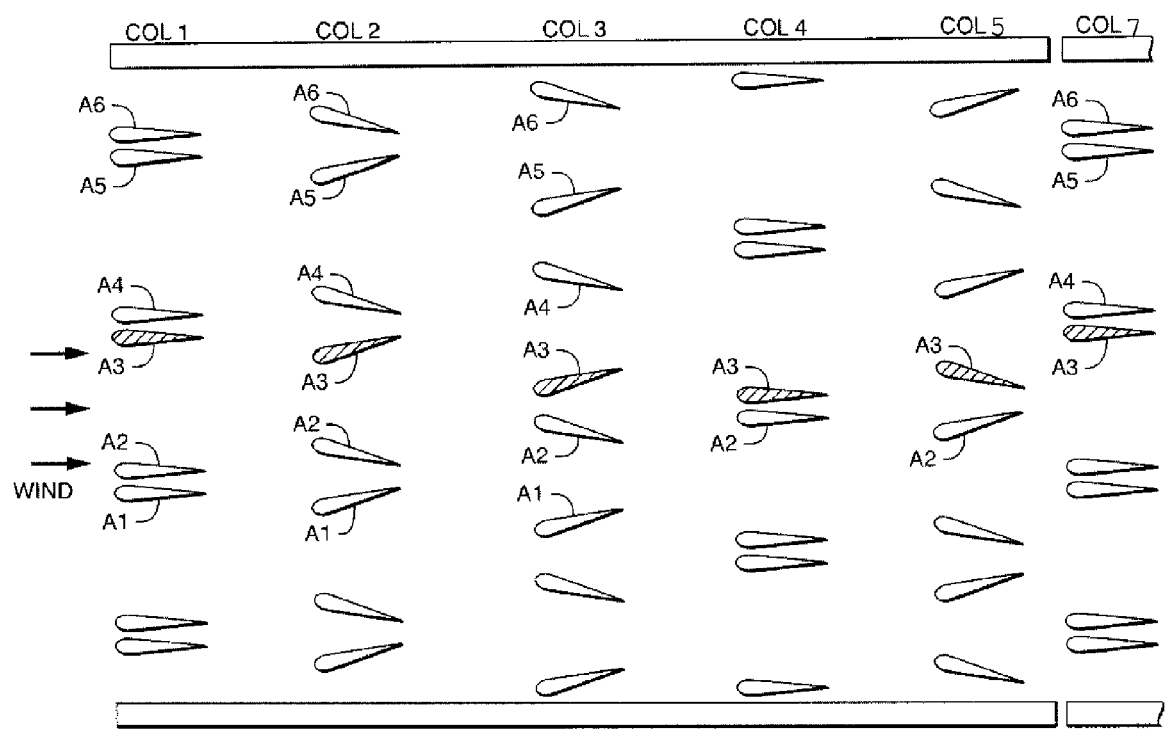
FIG. 3 depicts the positions and tilts of the blades as time progresses.

Referring next to FIG. 3 the positions and tilts of the blades as time progresses from left to right are shown.

Initially, as shown in the left column, the blades are oriented horizontally in pairs, with A6 and A5 comprising one pair, A4 and A3 comprising a second pair, etc. Note that the shaded blade is the lower member of the A4-A3 pair.

In column two the tilts of the blades are such as to cause the leading edges of the pairs to diverge from each other as commanded by the movements of the tilt rods A21, A22. This divergence, or "tilt", is caused to progress further as illustrated in column 3. Note the shaded blade A3, which was previously paired with blade A4, is now the upper member of close pair A3-A2. In this Column, however, the trailing edges of the pairs are farther apart that the leading edges.

Column 4 portrays the condition at the end of the first stroke where again the blades are oriented horizontally, as commanded by the tilt rods, driving the pairs of blades into a parallel relationship.

Column 5 portrays an early stage of the second stroke. For each array the polarity, or angle Φ of the tilt of the blades, as it appears in FIG. 13C, is such as to maintain the direction of movement of the array until it reaches the end of the current stroke. After this the polarity of tilt is reversed. Two full strokes constitute a full cycle.

During all strokes power is imparted to the crankshaft via the thrust rods, which are paired on each blade end as a forward thrust rod A11, A13, disposed closer to the wind, and a rear thrust rod A12 and A14 further away from the wind. The thrust arises from the pressure of the wind on the tilted blades, which drive blades tilted upwards, when a blade is tilted with the leading edge higher than the trailing edge, as in column 2 A4, and downwards, when the leading edge is lower than the trailing edge, as in column 2 A3.

As the first stroke or cycle progresses, Col 1 and Col 2, the rear thrust rods A12, A14 drive downward. During the next power stroke or cycle the forward thrust rod A11, A13 drive downward. The cycles then repeat themselves.

Figure 19:
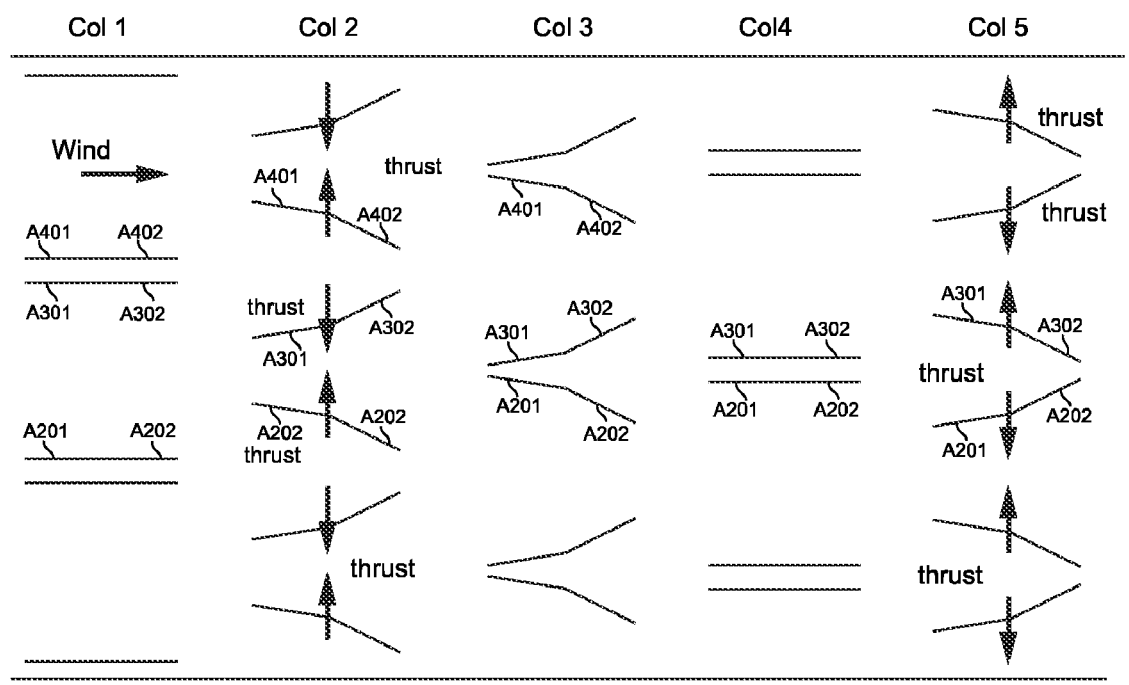
FIG. 19 depicts the time progression of the movement of articulated airfoils subject to the control illustrated in FIG. 18.

The progression shown in FIG. 19 is instructive in showing the reciprocating nature of the device. In Col. 1 of FIG. 19, the blades A401/402 are paired with A301/302. As the stroke progresses, blades A401/402 are convex upward, while blades A301/302 are convex downwards. Thus, the wind, flowing from the left of this drawing, will force them apart, as shown in Col. 3. As the stroke finishes, as shown in Col. 4, blade A301/302 is now paired with blade A201/202, in a planar configuration.

The following step, Col. 5, of this second stroke has blade A301/302 in a convex upward, while blade A201/202, which was convex upward in the first stroke, is now convex downward. As a result, the pair A301/302 and A201/202 will be driven apart.

It is thus shown that during the first stroke, the thrust as the blades of the pair separate, drive the thrust rods in one direction, while during the second stroke the thrust rods are driven in a down direction. A301/302 is driven down during the first stroke, and upwards during the second stroke, as do the thrust rods affixed to blade A301/302. The cycle repeats again, with every second stroke repeating the steps of Columns 1-4, and every other stroke repeating the steps of Columns 5-7 (Col. 6 is not shown, but is a final progression of the configuration shown.) Thus, the thrust rods make a reciprocating motion, which is converted into a rotary motion, which powers the electric generator.

These alternating downward strokes are transformed into rotational motion by the crankshaft A7 in the same manner as in a typical internal combustion engine.

The time required for the blades to be driven apart, and thus the time period between strokes, will be a function of several factors: the size and number of blades, their weight, the friction of the components, etc. And it will also depend on the strength of the wind, just as the period of the internal combustion engine depends on the richness of fuel mixture. As in the internal combusion engine, the period is inversely proportional to the RPM of the crankshaft.

In the present device a new stroke should be timed to begin directly after the end of the previous stroke, using the tilt control of the blades to begin the new stroke. Thus, as the speed of the fluid flow increases the period of the strokes decreases, and the RPM of the crankshaft increases accordingly. The strokes of the present device are thus synchronized by means of the tilt mechanism, the same way that the strokes of the internal combustion engine are synchronized by means of the opening and closing of the intake and exhaust valves.

Thus the present device is a true reciprocating engine, alternating between two strokes which repeat themselves at a constant rate for any particular speed of fluid flow, within the limits of their operation.

Figure 4:
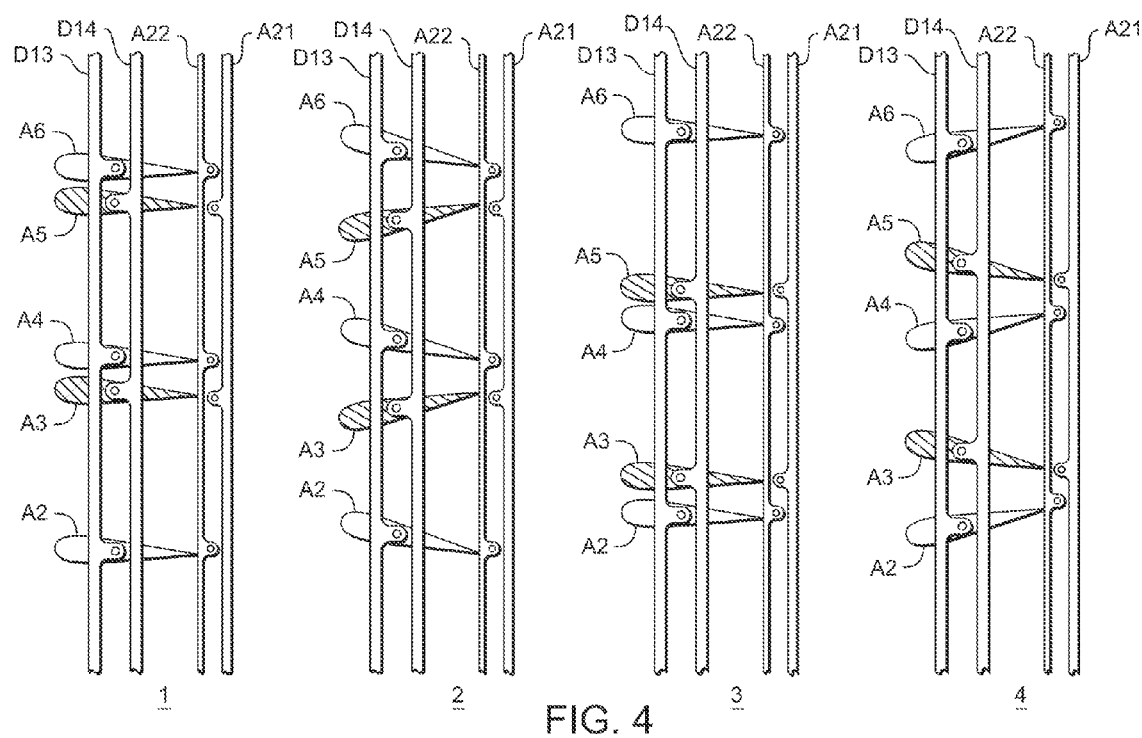
FIG. 4 depicts the positions and tilts of the blades together with their corresponding engagement with thrust rods and tilt rods as time progresses.

Referring now to FIG. 4 the positions and tilts of the blades are shown, together with their engagement with thrust rods D13, D14, and the tilt rods A21, A22 as time progresses.

Initially, as shown in the column 1, the blades are oriented horizontally in pairs, the blades of each pair parallel to each other. Note that the shaded blade is the lower member of each pair. In column 2, as a result of the positioning of the tilt rods, and also aided in part by rotary inertia of the crankshaft, the imposed tilts are such as to cause the pairs to diverge in response to wind incident from the left. Column 3 portrays the condition at the end of the first stroke where again the blades are oriented horizontally. Blade A6 has been driven upward, pulling thrust rod D13 upward, and Blade A5 has been driven downward, pushing thrust rod D14 downward. Note the shaded 700 blades are now the upper members of nearest pairs. Column 4 portrays an early stage of the second stroke. Again the imposed tilts cause nearest neighbors to be forced apart by the wind and, consequently, to drive the thrust rods in opposing directions.

Although the next stage of stroke 2 is not shown, it should be evident that the final stage of stroke 2 will be identical with the configuration shown in Col. 1. Thus, the process can continue indefinitely, with the thrust rods being thrust in opposite directions, and each of the thrust rods first being driven in one direction, and then in the opposite direction, in the form of a reciprocating engine Referring next to FIG. 5. an alternative version of the crank shaft is shown, in which the coupling between the thrust rods and the crank throws are replaced by Scotch yokes D1, D2, D3, D4, and the bottom of each thrust rod is formed into an offset thrust rod extension, which is integrally affixed to the top of the corresponding Scotch yoke. Thus the thrust rods D11, D12, D13, D14 couple directly to the crankshaft Scotch Yokes, avoiding use of connecting rods A31,A32,A33,A34 in the first embodiment, as shown in FIGS. A1 and A2. Tilt rods A21, A22, positioned by linear motors A41, A42 control the tilts of the arrays. Note that in this figure only one blade of each array is shown, although in the actual working embodiment several sets of blades are required. In the relevant art literature of mechanisms, the Scotch Yoke is also called a "crank-and-slider".

The angle sensor A43, necessary for actual operation, is not shown in this figure.

Figure 5:
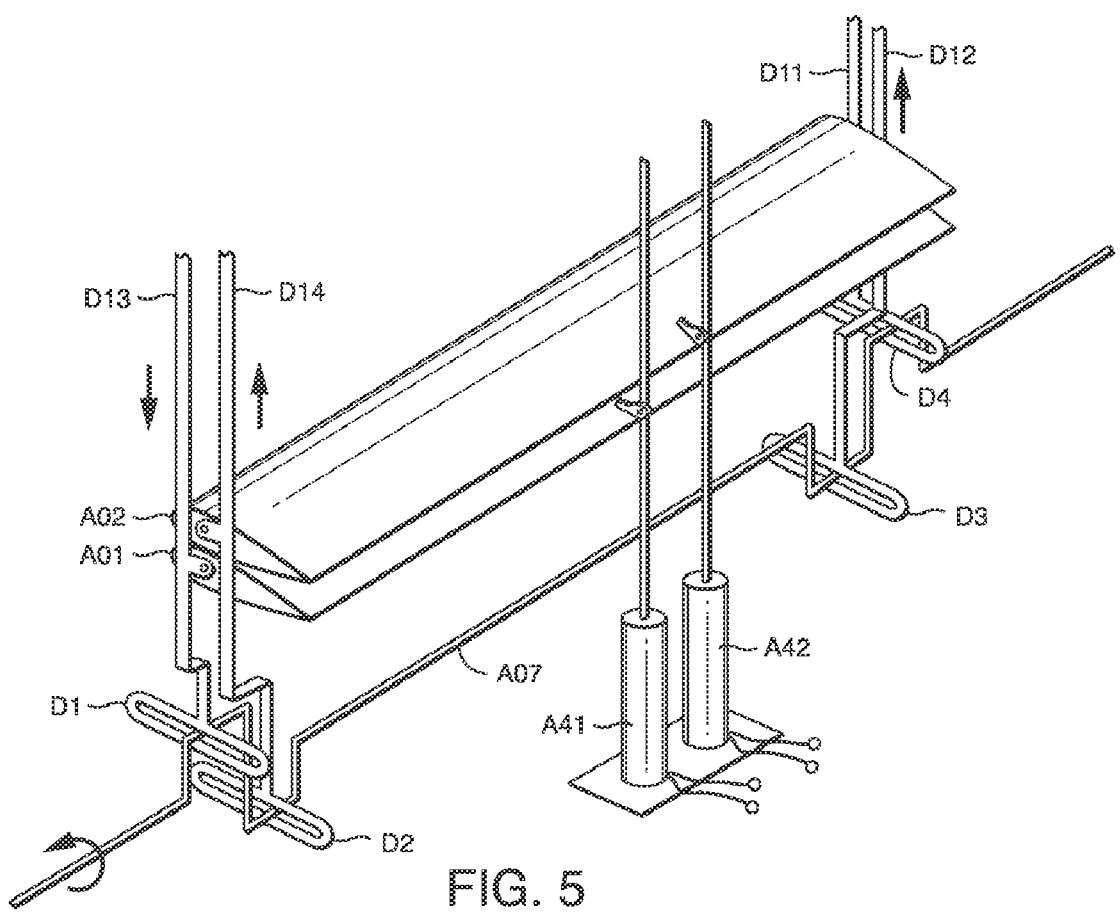
FIG. 5 depicts a perspective illustration of the lower portion of an embodiment of the device.
Figure 6:
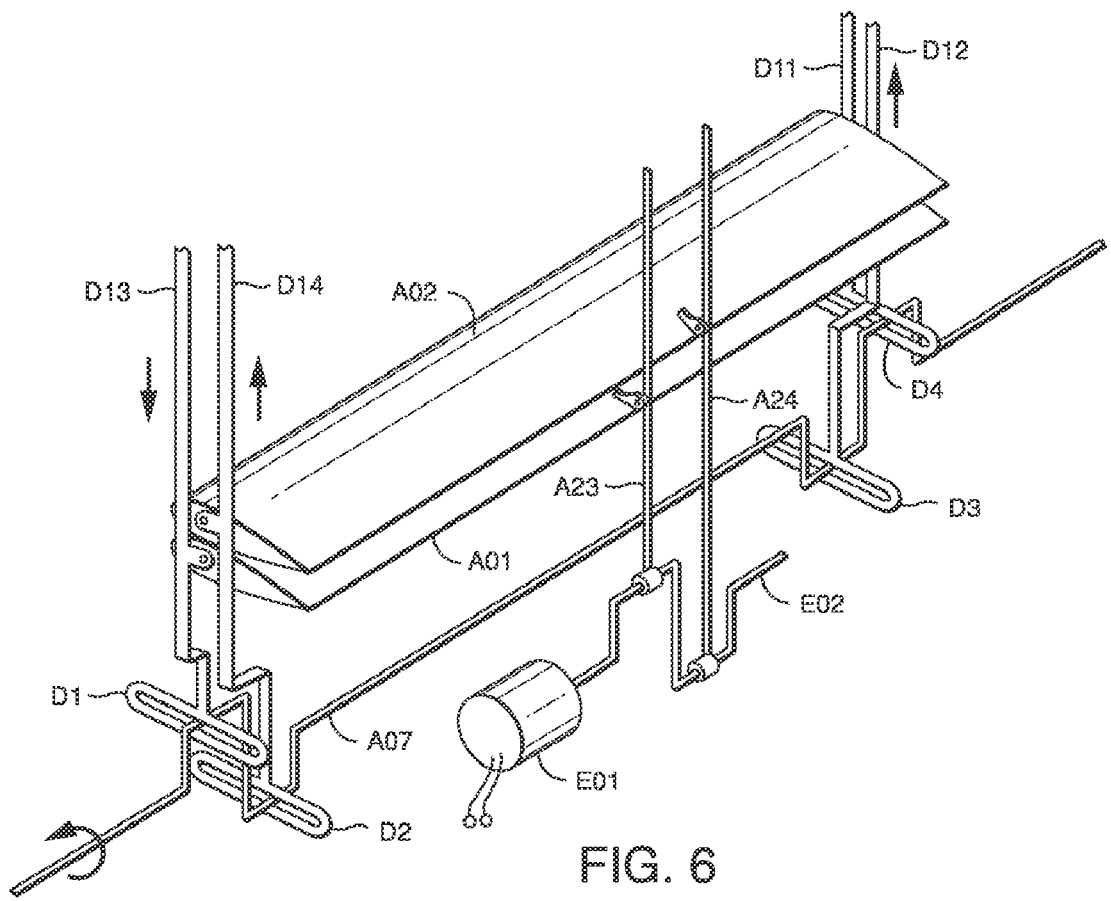
FIG. 6 depicts a perspective illustration of the lower portion of an embodiment of this device in which the pair of linear motors (A41, A42) providing tilt control have been replaced by a flat crankshaft driven by a motor.

Referring next to FIG. 6, an alternative embodiment to the device of FIG. 5 is shown. In the current figure, the linear motors are replaced by a second crankshaft E02, which performs the same function as the linear motors of FIG. 5. That is, the tilt of the blade arrays is controlled by the second crankshaft, which in turn is powered by the electric motor E01. As in FIG. 5 the Scotch Yokes convert the longitudinal movement of the thrust rods to rotary motion of the main crankshaft A07. Here linkages A23, A24 are pivotably coupled at both ends. One end of each is coupled to a crank pin, or throw E03, E04, on the auxiliary crankshaft E02, and the other end is coupled by a wrist bearing or bushing E05 to the tilt rods A21,A22 that couple to the trailing edges of blades in each array. By using a single electric motor the complexity of the electronics for control of the array tilts is reduced. An angle sensor A43, as shown in FIG. 1, is required in this embodiment, but not shown in the present figure.

Figure 7:
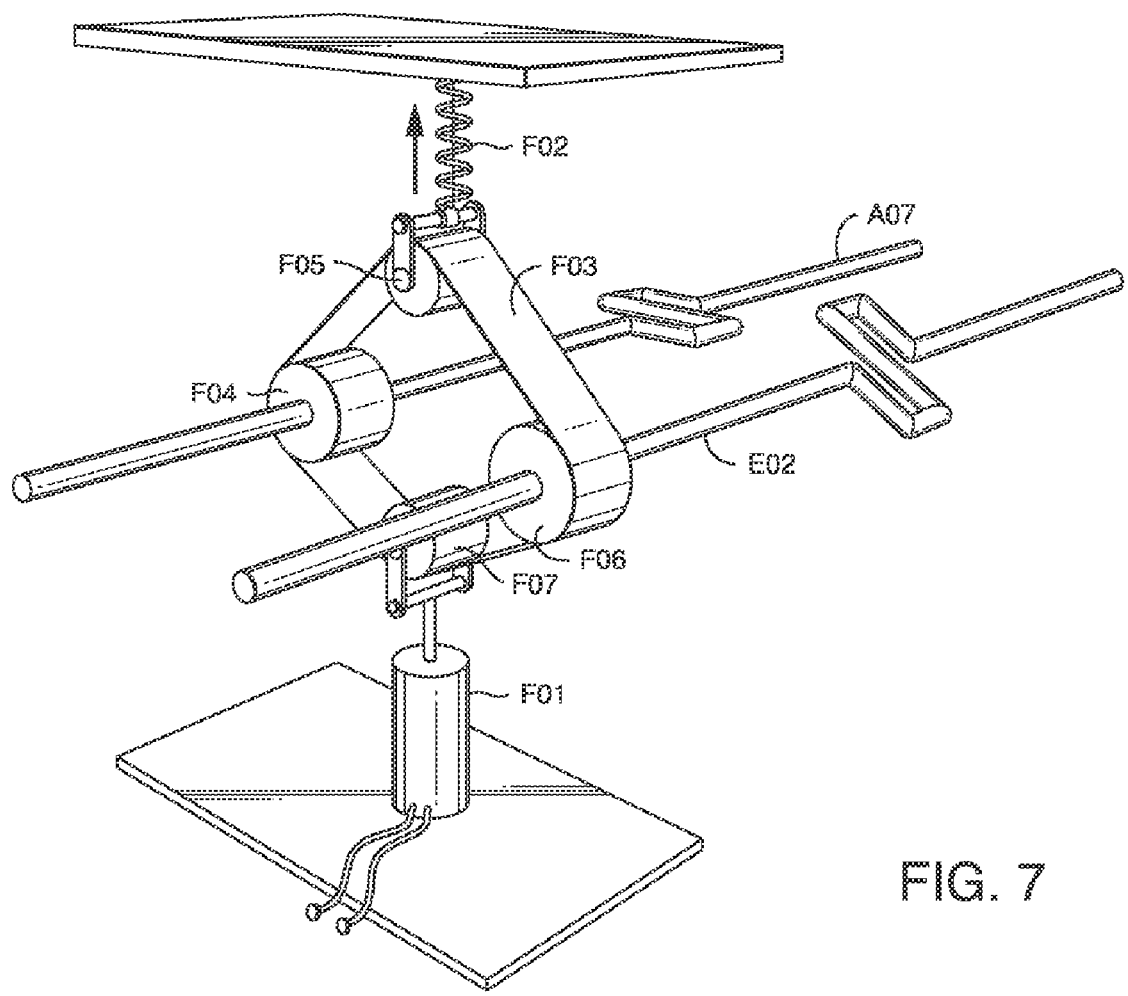
FIG. 7 depicts a perspective illustration of a mechanical means for control of blade array tilts using a single linear motor F01.

It should be obvious that the two crankshafts of the embodiment shown in FIG. 6 must be synchronized, analogous to the need for synchronizing the valves in an internal combustion engine with the crankshaft. Thus, the embodiment of FIG. 6 must provide a means for varying the rotational angle of the two crankshafts relative to each other. FIG. 7 shows a component device for accomplishing such a variation.

Referring now to FIG. 7, a device for the control of blade array tilt angle synchronization using a single linear motor F01 is shown. The spring F02, together with wheel F05 ensures the belt or chain F03 is under tension at all times. The upper end of the spring F02 is affixed to a surface which is fixed in relationship with the exoskeleton of the transducer, as is the bottom of the linear motor F01. Wheel F04 is integrally affixed to the principal crankshaft A07, and wheel F06 is integrally affixed to slave crankshaft E02. The height of free spinning wheel F07, and thus the degree of rotation of slave crankshaft E02 relative to principal crankshaft A07 is determined by the height of free spinning wheel F07 which is in turn controlled by the linear motor F01. Since the belt or chain F03 in this embodiment is actually a timing belt or chain, the preferably implementation would be one in which the belt or chain F03 would be a "knobby" chain such as those intended for use on mountain bikes, and wheels F04 and F06 would have notches which complement the knobs on the chain to avoid slippage, which would adversely affect the phase tracking of the crankshafts.

Figure 8:
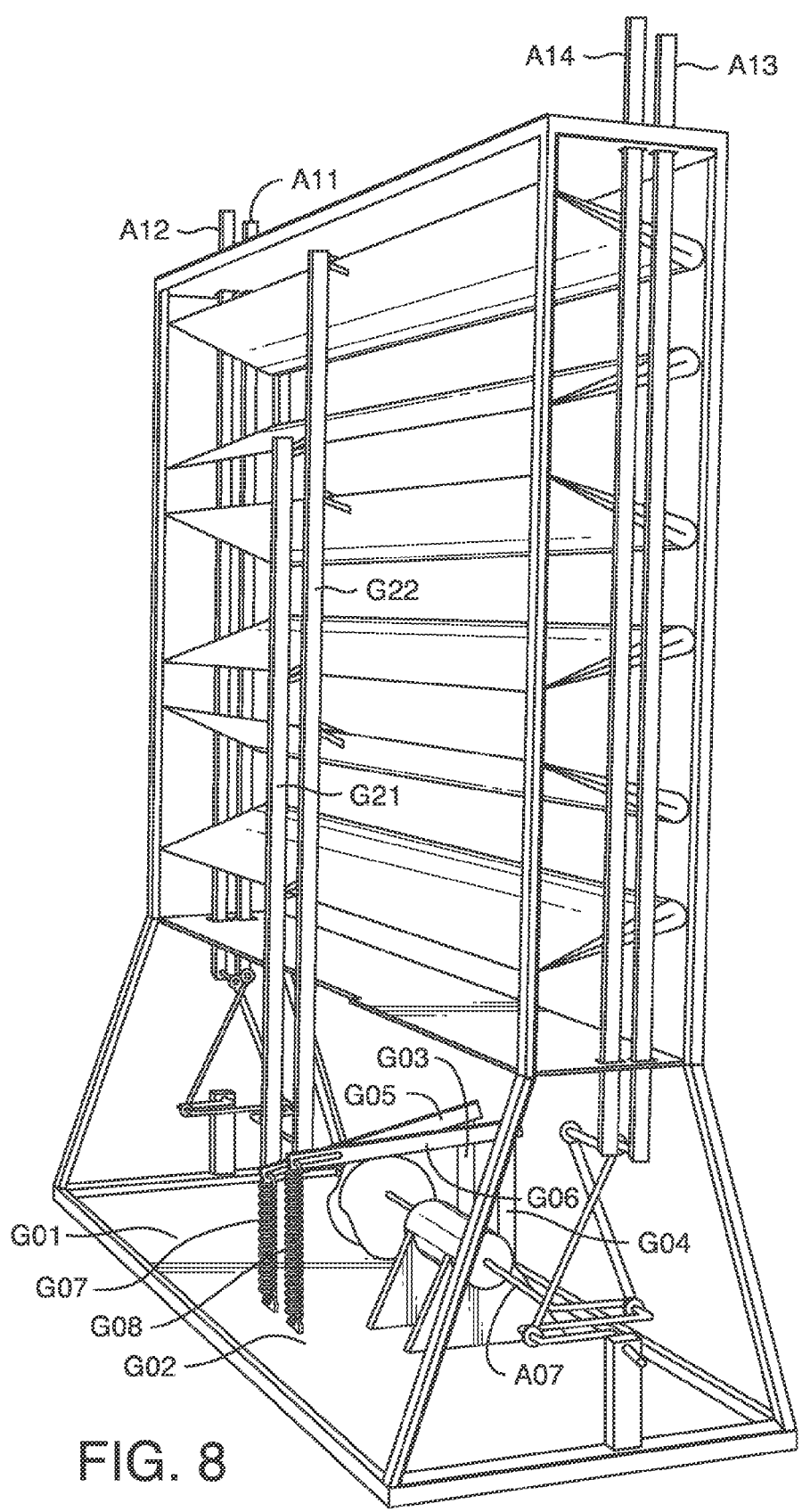
FIG. 8 depicts a perspective illustration of an embodiment of this device for which the tilts of the blade arrays are determined solely by mechanical means incorporating cams for driving the tilt rods.

Referring next to FIG. 8, an embodiment of this device for which the tilts of the blade arrays are determined solely by mechanical means is shown. Two identical shaped cams G01, G02 are mounted to the crankshaft A07 with a phase difference of 180-degrees. These cams control the heights of the downwind tips of rocker arms G05 and G06 respectively.

G05 and G06 rocker arms are rotationally affixed to the upper ends of structural posts G03, G04, said structural posts being rigidly affixed to the bottom panel G30 of the exoskeleton. The rocker arms have bushings or cylindrical bearings located approximately midway along their length, said bushing or bearings riding upon the cam guide surface. Tilt control rods G21, G22 are extended versions of rods A21, A22 of FIG. 1. In the present embodiment the bottom ends of the tilt rods are rotationally affixed to the ends of the corresponding rocker arms opposite to the ends affixed to the structural posts (the "downwind" ends.) To accomplish this rotational connection, the bottoms of the tilt rods have pins extending laterally into slider slots within the downwind ends of the rocker arms. Tension springs G07,G08 ensure constant contact between the cams G01,G02 and the corresponding rocker arms.

This embodiment does not adapt to varying wind conditions but is particularly suitable for airborne (kite or balloon) supported and tidal applications. It can be made in a particularly light fashion for airborne applications. Tidal flows are basically predictable and consistent so there is no need for adaptation. Adaption to current conditions is an especially important issue for land based wind powered transducers.

Figure 9:
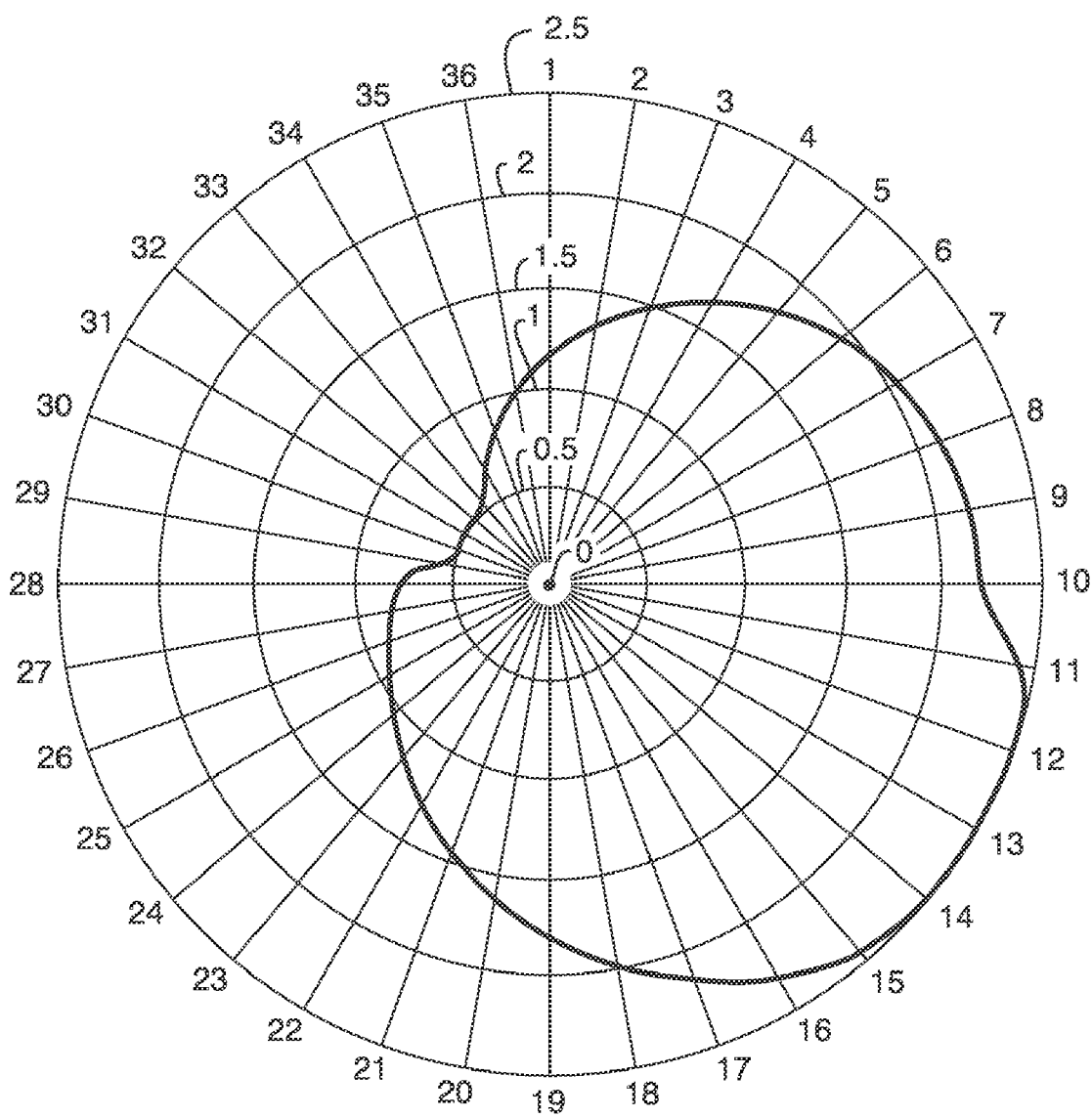
FIG. 9 depicts a cam employed in the all-mechanical embodiment of the device shown in FIG. 8, the cam providing +/−18-degree tilt of blade arrays.

Referring next to FIG. 9, an embodiment of the cams employed in the all-mechanical embodiment of the device 810 shown in FIG. 8 is shown.

This drawing illustrates the shape of a cam providing +/−18-degree tilt of blade arrays. This cam profile maximizes the "flying" time of blades at array tilts of +18-degrees and −18-degrees It basically minimizes the fraction of time spent reversing tilt near the extremes of blade travel. The radius 2.5 in the chart corresponds to the blade trailing tips being at one extremum and the radius 0.5 corresponds to the other extremum. The semicircular portions are associated with the blade trailing tips tracking behind the central blade spars such as to produce 18-degree tilts. NACA analysis shows for isolated airfoils a tilt of 18 degrees is good single choice for symmetric airfoils in modest (5 meter per second) winds. Because of aerodynamic interactions between neighboring blades when close to one another, this choice of 18 degrees is not likely to be an optimum.

Figure 10:
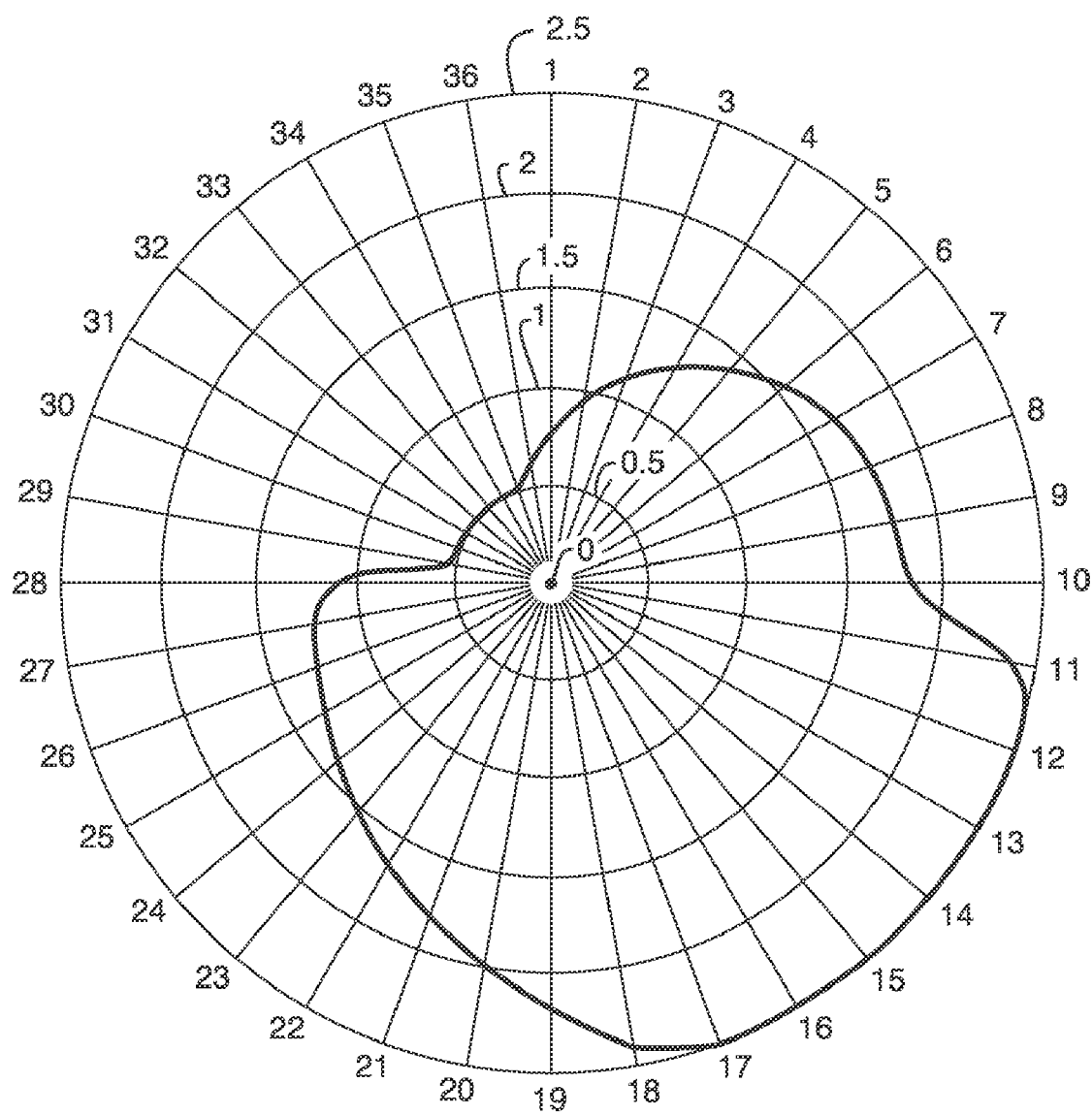
FIG. 10 depicts a cam employed in the all-mechanical embodiment of the device shown in FIG. 8, the cam providing +/−45-degree tilt of blade arrays

Referring next to FIG. 10, an alternative shape to the cam of FIG. 9 is shown. FIG. 10 shows the shape of a cam providing +/−45-degree tilt of blade arrays. A tilt of 45 degrees is extreme but is appropriate for the rare locations where wind speed is typically 8 meters per second or more and where the excursion of each blade, shown as D20 in FIG. 13B, is considerably more than the chord length of the blades, shown as D22 in FIG. 13B. Chord length is defined here as the distance between the leading and trailing edges of the blade. Otherwise the blades interact via their shared airstream and affect one another a significant fraction of the time. That is, during these intervals they are not really "flying" independently.

Basic application of Bernoulli's principles is not sufficient, rather the effects related to the interaction between nearest blades acquire a pneumatic character. This pneumatic domain of application is called "trap and release".

When the cycle begins, as shown in Col 1, FIG. 3, the blades are parallel to their mating blades, as, for instance, A3 and A4 in Col 1. As the cycle proceeds, the leading edges of each pair rotate away from each other, as in Col 2. Thus, the distance between the leading edges of blades A3 and A4 are substantially larger than between the trailing edges of those blades, and the air at the leading edges becomes "trapped", and exhibits a vertical pressure pushing the blades apart. As the blades separate, the trapped air is "released". This vertical pressure is the main component of the force which results in the vertical movement of the thrust rods A11-A14.

Figure 11:
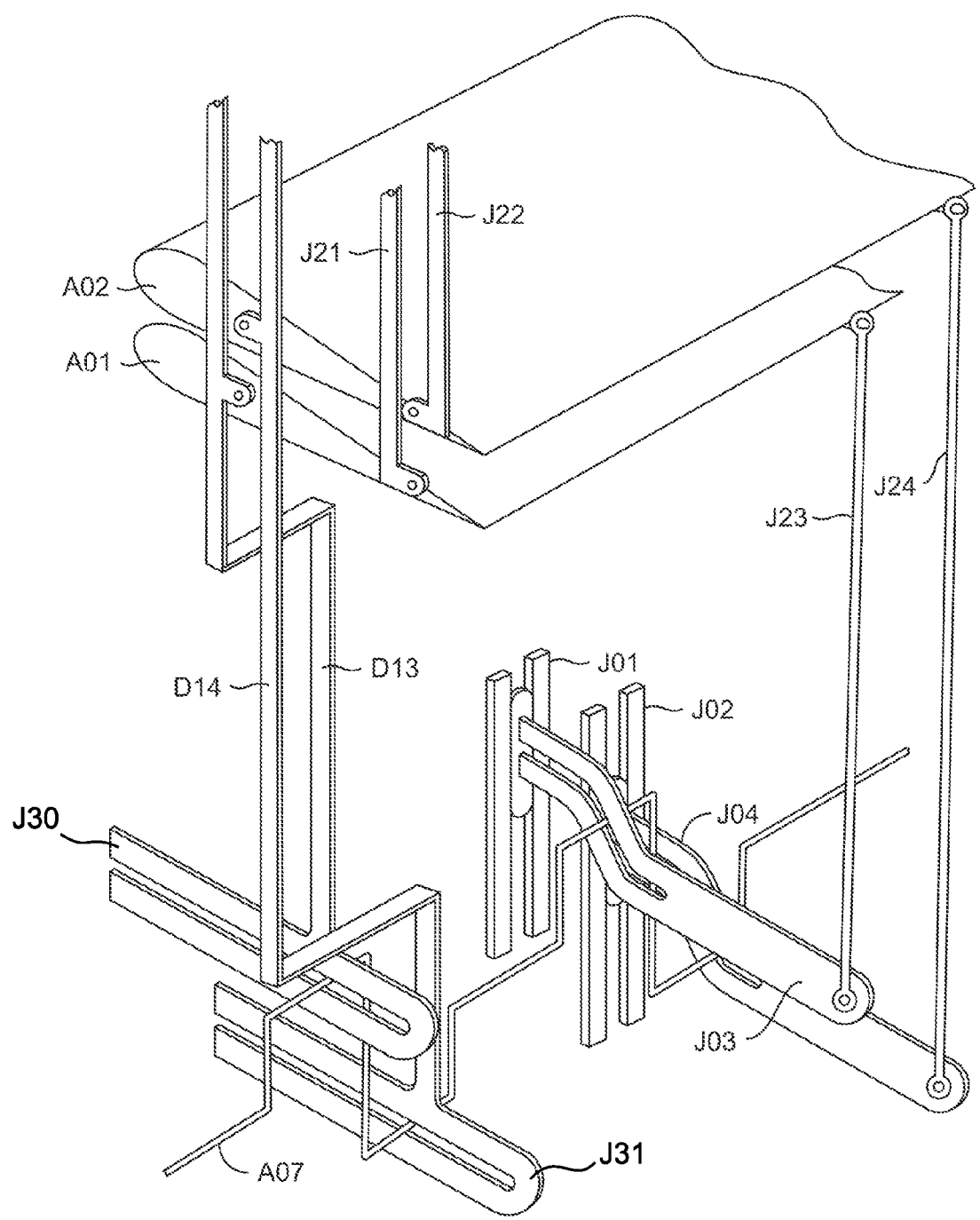
FIG. 11 depicts an alternative all-mechanical means for controlling blade tilts by means of Polish Yokes.

Referring now to FIG. 11, an alternative all-mechanical means for controlling blade tilts is shown. The Scotch Yokes J30, J31 are open on the ends, unlike the traditional form of Scotch Yoke which appears in FIGS. 5 and 6. The traditional definition of the Scotch Yoke is one having a guide slot for a pin or bearing, said guide slot being perpendicular to the longitudinal travel of a power source or load, e.g. a piston. The pin is commonly a crank pin, or throw, that orbits in a circle and rolls within the slot of the Scotch Yoke. The guide path, however, need not be perpendicular to the longitudinally moving member and, furthermore, it can be curved. For convenience we define this adaptation of the Scotch Yoke as a "Polish Yoke". In this figure Scotch Yokes are shown as integrally affixed to vertical thrust rods D13, D14 and couple these to corresponding crank pins of the crankshaft A07. In near proximity Polish Yokes J03, J04 couple crank pins co-linear with the thrust pins to affect the tilt of the blade arrays via the connecting rods J23, J24. The latter have pivot joints at both ends. Sliders J01, J02 ensure the Polish Yokes only move vertically, and are affixed to the exoskeleton. The curvature of the guide slots in the Polish Yokes shown in FIG. 11 produce fixed but equal and alternating angles of tilt for the respective blade arrays.

It should further be noted that the J21 and J22 are included in this embodiment in order to transmit tilt to the blades of the other arrays, since connecting rods J23 and J24 terminate at the lower-most blade in this embodiment.

Figure 12:
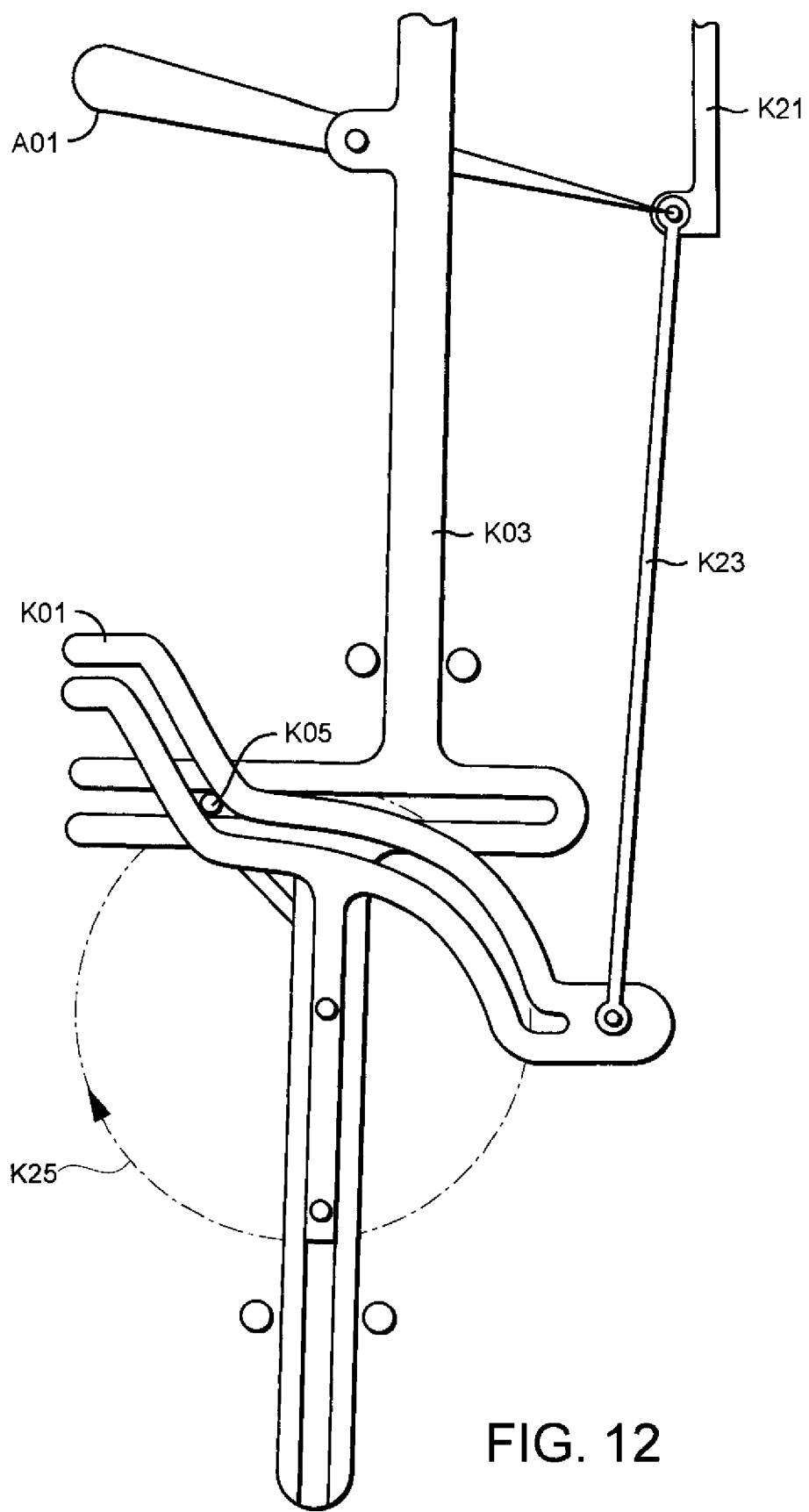
FIG. 12 depicts an all-mechanical means for achieving a "Trap and Release" function.

Referring next to FIG. 12, an all-mechanical means for achieving a "Trap and Release" function is shown. Should the chord length of a representative blade be significantly longer than half the vertical excursion of the blade, as shown as D20 in FIG. 13A, it is possible to block airflow (or water flow) for a significant fraction of the time. During these intervals the pressures involved are best described as pneumatic (or hydrodynamic) in character, in contrast with wings subject to continuous airflow which exhibit "flying" by an airfoil as a result of the Bernoulli effect. The work done upon the blades during the opening of the trap corresponds to the adiabatic expansion of working fluid in a Carnot Engine. Embodiments in which the blade tilts are electrically controlled producing this "trap and release" character simply require an adjustment of programming, assuming the blade chord vs spacing is as described above. This figure is an open plan view for only one of the blade arrays; it exhibits a combined Scotch-Yoke/Polish-Yoke means for achieving "trap and release" character by mechanical means alone. Crank pin K05 orbits K25 as shown, determining the tilt of the blade A01 via the pin travel within the curved slot of the Polish Yoke K01. Meanwhile the pin is being driven by the Scotch Yoke thrust rod K03. As shown the thrust rod K03 is constrained to move vertically and the Polish Yoke member K01 only moves vertically relative to it, as it is constrained by a vertical slider (not shown in this drawing.) Again it should be stated that embodiments that employ all-mechanical means are especially appropriate for airborne and tidal applications whereas embodiments employing electrical control of blade tilt are especially appropriate for achieving maximum average power yield.

The "trap and release" effect may be better understood by reference again to FIG. 3, which illustrates the time progression of airfoil arrays performing "Trap and Release". In this figure the leftmost column, Col 1 illustrates the several interleaved arrays of blades in sectional view at the beginning of a stroke. The wind is incident from the left. The next column, Col 2 illustrates the blade tilts and separations midway in the stroke. The fourth column, Col 4 illustrates the disposition of the blades at the end of the first stroke and the beginning of the following stroke. At mid stroke the forces on the blades are static. The forces due to the wind are perpendicular to the chords thus tending to force the opposing blades apart in the vertical direction. As they separate the built up pressure is adiabatically relieved. Because the pivot axis (the spar) of each blade is near mid-chord in position (not shown) the torque required for controlling the tilt of the blades is minimal. Note that if the blade chords were 25 percent longer the fluid flow would be momentarily halted altogether. In contrast, had the maximum tilt been limited to 15 to 20 degrees, it is apparent that a significant fraction of the stroke could be described as "flying" in character rather than "pneumatic".

Figure 14:
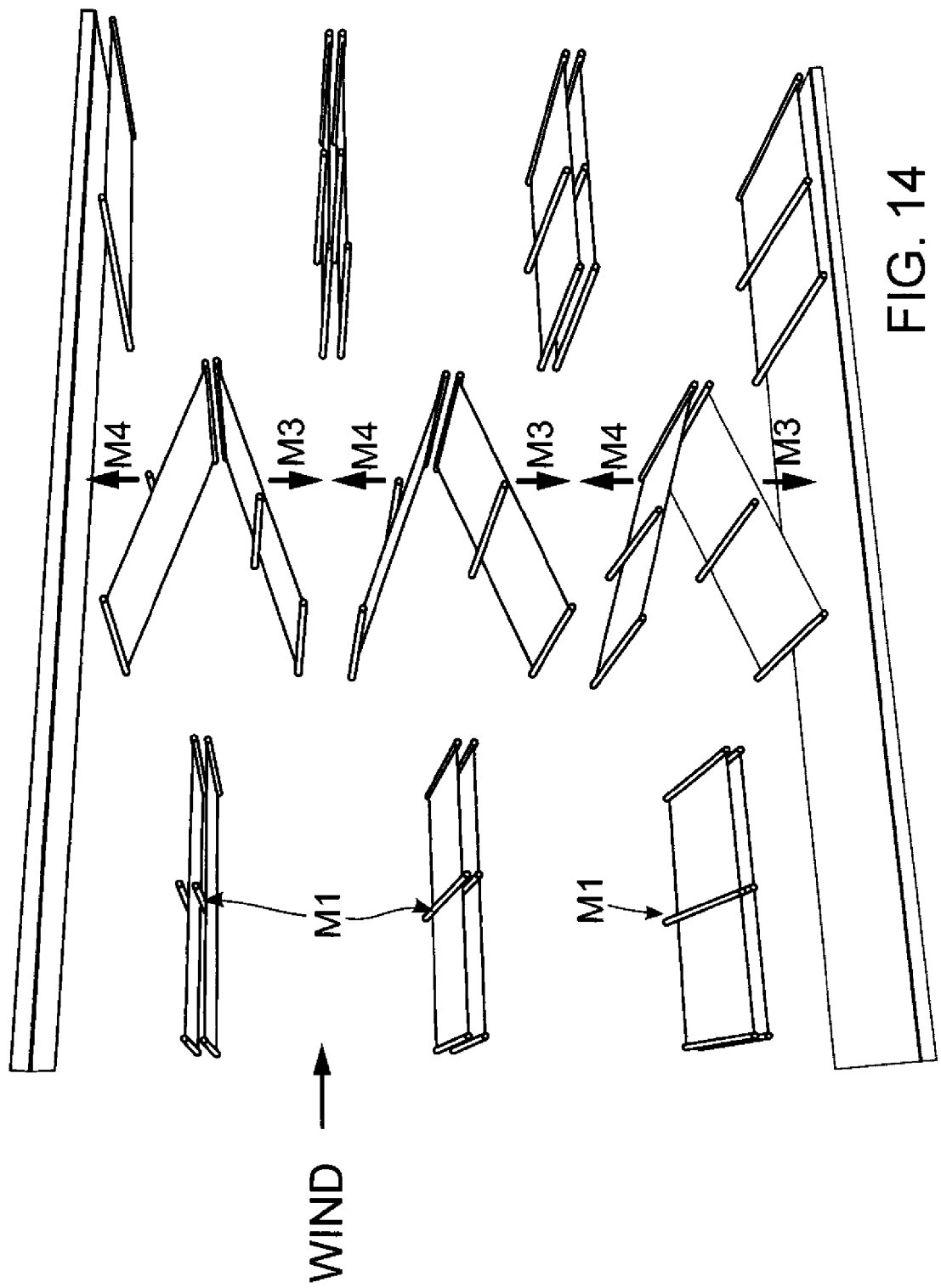
FIG. 14 depicts the time progression of "Trap and Release" accomplished with flat sailcloth blades.

Referring next to FIG. 14, the time progression of "Trap and Release" accomplished by an embodiment using flat sailcloth blades is shown. In this figure the leftmost column illustrates the two interleaved arrays of sailcloth blades in sectional view at the beginning of a stroke. The blades here are long enough to fully implement the trap and release process. The wind is incident from the left. The center column illustrates the blade tilts and separation midway in the stroke. This clearly shows the combination of the two arrays functioning as planar valve rather than as a collection of "flying" wings. The right column illustrates the disposition of the blades at the end of the first stroke and the beginning of the following stroke. The pivot axis Ml, or "spar", of each blade is approximately mid-chord; As a result, the air pressure on the blade forward of the spar is about equal to the pressure aft of the spar, so that the torque required for controlling the tilt of the blades is minimal. The vertical thrust component of the force on each blade at mid stroke is represented by arrows, M4 for upward thrust, and M3 for downward thrust.

Figure 15:
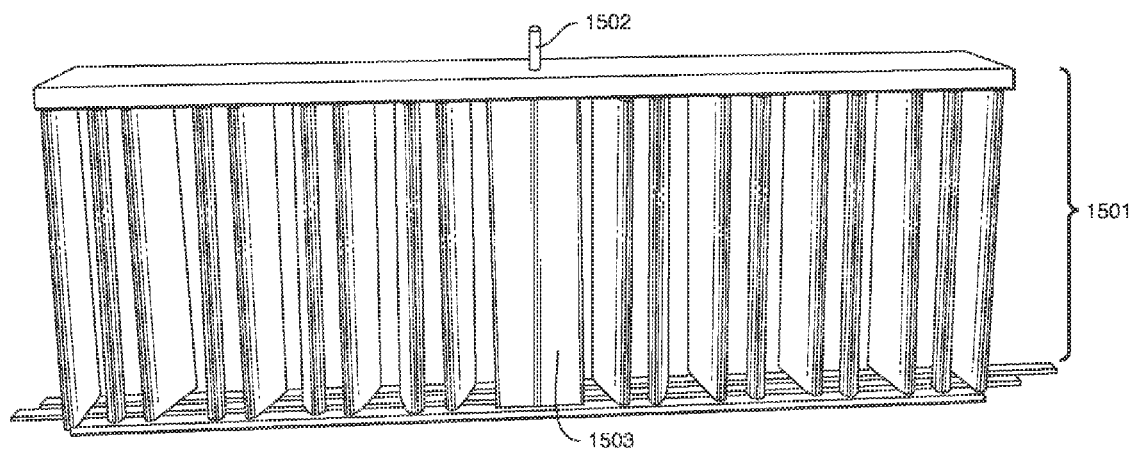
FIG. 15 depicts a prone oriented ("fence") embodiment of the interleaved reciprocating array transducer.

Referring next to FIG. 15, a prone oriented ("fence") embodiment of the interleaved reciprocating array transducer 1501 is shown. Fluid flow is directed from the viewer toward the transducer. Here the blade spars (not shown) are vertical, the two blade arrays are divided in two and the end of the vertical flat crankshaft 1502 is located at the center of the fence, and vertically disposed at the top of the crankshaft 1503F. The two halves, left and right, are engaged with this same flat crankshaft. This embodiment is especially appropriate for mounting upon the edges of flat roofs and is also suitable for tidal applications. Embodiments intended for roof applications would preferably have tilt control implemented electromechanically (not shown).

Figure 16:
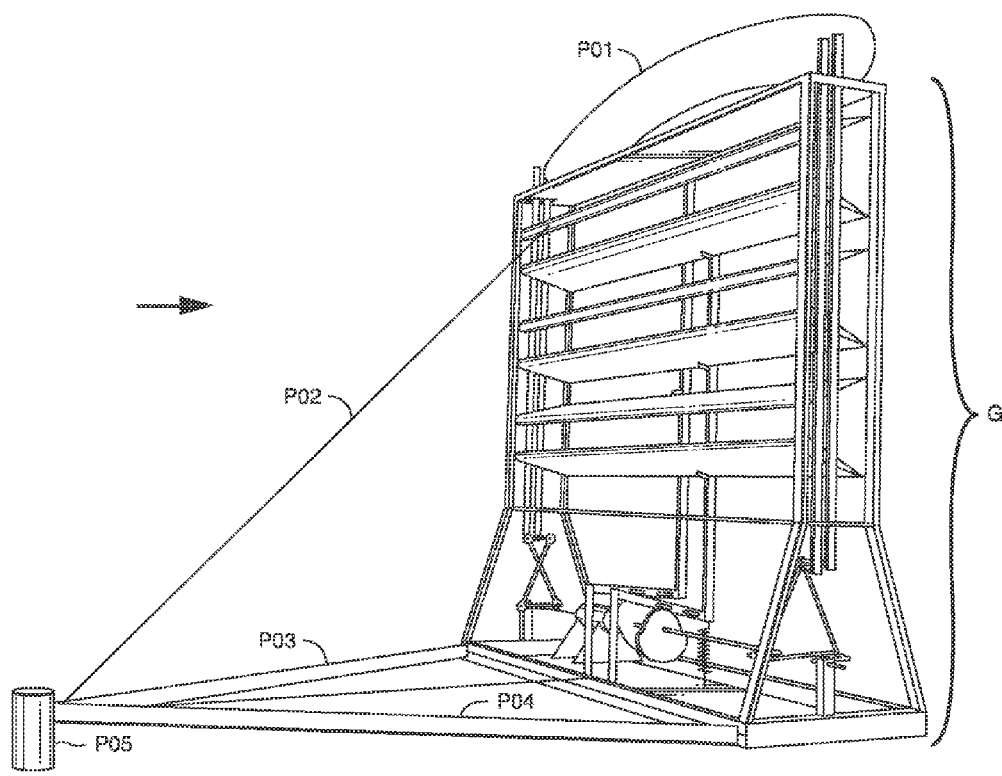
FIG. 16 depicts a vertically oriented embodiment of the device for conversion of tidal power.

Referring now to FIG. 16, a vertically oriented embodiment for conversion of tidal power is shown. The structure within the exoskeleton is the same as in FIG. 8, but other embodiments of this portion of the device considered earlier could serve in its stead. In addition, other components attached to the transducer are provided for converting power associated with tidal flow to useful electric power.

Item P01 is a buoyant member intended to maintain the transducer in an erect position, as shown in this figure. Element P05 is an anchored pivot about which the suspended transducer can rotate in response to changes in the direction of tidal flow. Structural struts P03 and P04 attach to the lower frame of the transducer and to the anchored pivot P05 to maintain the transducer at a fixed distance from the anchored pivot. Cable P02 links the upper portion of the transducer to the anchored pivot P05. Together with Struts P03 and PO4, it helps to further stabilize the structure, thereby maintaining the transducer in an erect position regardless of the intensity of tidal flow or changes in the flow direction.

Figure 17:
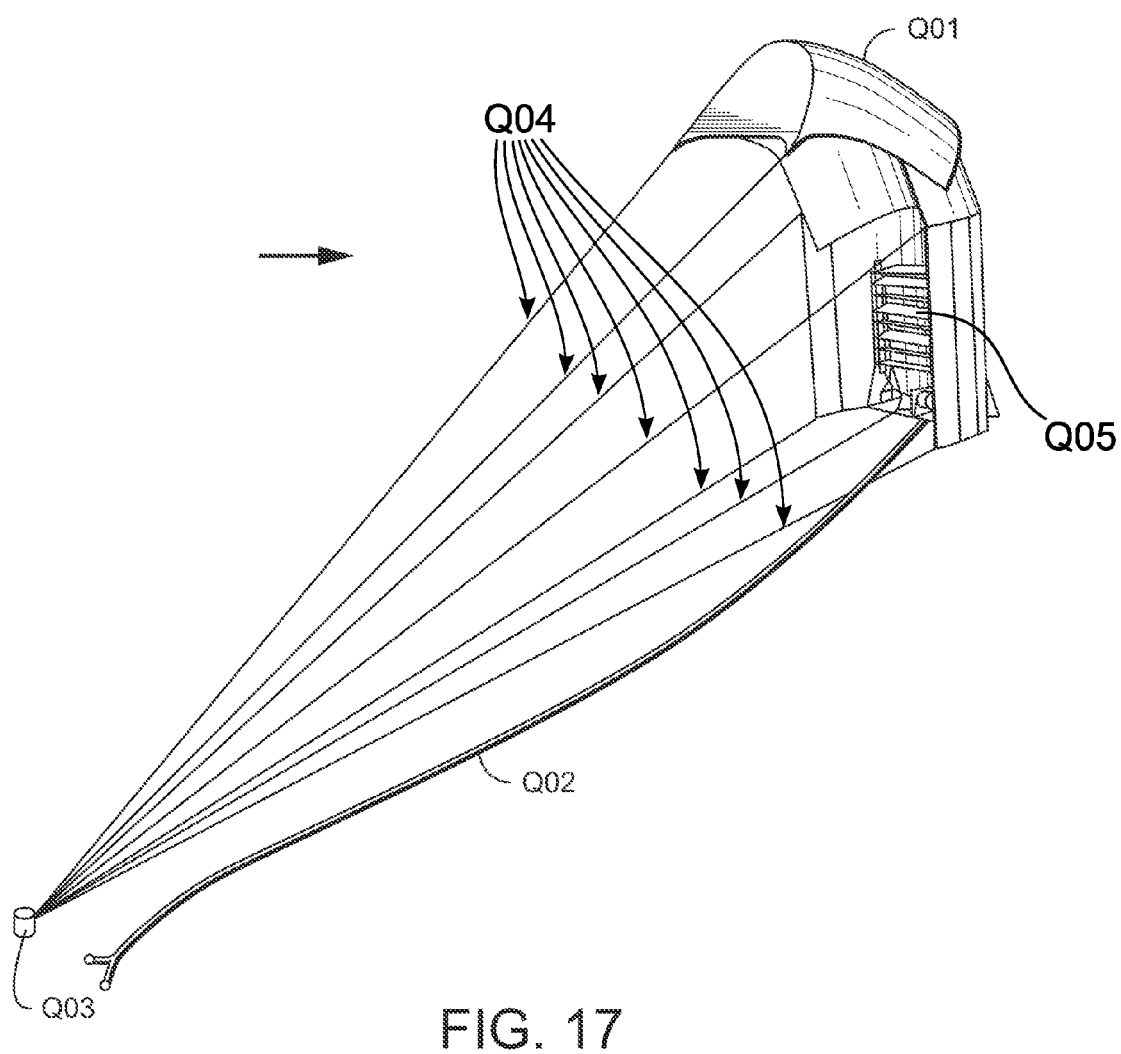
FIG. 17 depicts an airborne application of the subject device where a large kite lifts the subject transducer.

Referring now to FIG. 17, an airborne embodiment of the transducer is shown. The transducer Q05 is carried aloft by a large kite Q01. Flight occurs when prevailing winds exceed a threshold velocity determined by the area and shape of the kite and the weight of the transducer. In the embodiment shown seven cables Q04 tether the kite to a land-based anchor Q03. A slack electric cable Q02 delivers electric power produced by the electric generator within the transducer to a land-based terminus. The interleaved reciprocating blade arrays continually balance their positive and negative lifts and pressures, hence the kite perceives the transducer as a passive weight, assuming that the two arrays have equal numbers of identical blades.

Another embodiment of the present transducer involves the use of articulated airfoils as blades in place of the blades shown of FIGS. 1 through 6. The blades in those previous figures have symmetrical cross sections, as may be seen, inter alia, in FIGS. 1 and 4. As noted in FIG. 13A, the airflow over the top of the blade is traveling a substantially longer distance than that at the bottom of the blade, thereby resulting in an area of lower pressure, or "lift" at the top of the blade, which may be properly described as an airfoil.

It is well known that modern sailboats, having fore-and-aft rigs, such as the Marconi and gaff rig, sail close to the wind by inducing a "lift" at the leading edge of the sail, which bellies out on the leeward side, so that the sail becomes, in effect, an airfoil under these circumstances.

The use of hard sails on sailboats is also well known, and were used, for instance by "Stars and Stripes" the U.S. entry in the America's Cup race of 1988. The "sail" in that case used a carbon-fiber rigid sale with two joints, allowing the profile of the sail, as viewed from above, to also comprise an airfoil, due to the longer path the wind followed on the windward side of the sail when close-hauled.

It is noted that the effect of "lift" in the case of a sailboat is not present when the boat is sailing before the wind, wherein the wind is merely pushing forward on the sail. This is also true when the wind is blowing from the quarters of the sailboat.

Similarly, any Bernoulli effect in the present device will be present to a much greater degree when the tilt angle Φ, as shown in FIG. 13C, is small, that is, near the beginning of the stroke. As the tilt angle Φ increases, the pneumatic effect begins to predominate, taking over completely when the excursion of the blades is at a maximum.

The use of an articulated blade is believed to enhance the efficiency of the transducer, and provide more energy output compared to an embodiment which relies mainly on the pneumatic effect to produce electricity.

Figure 18:
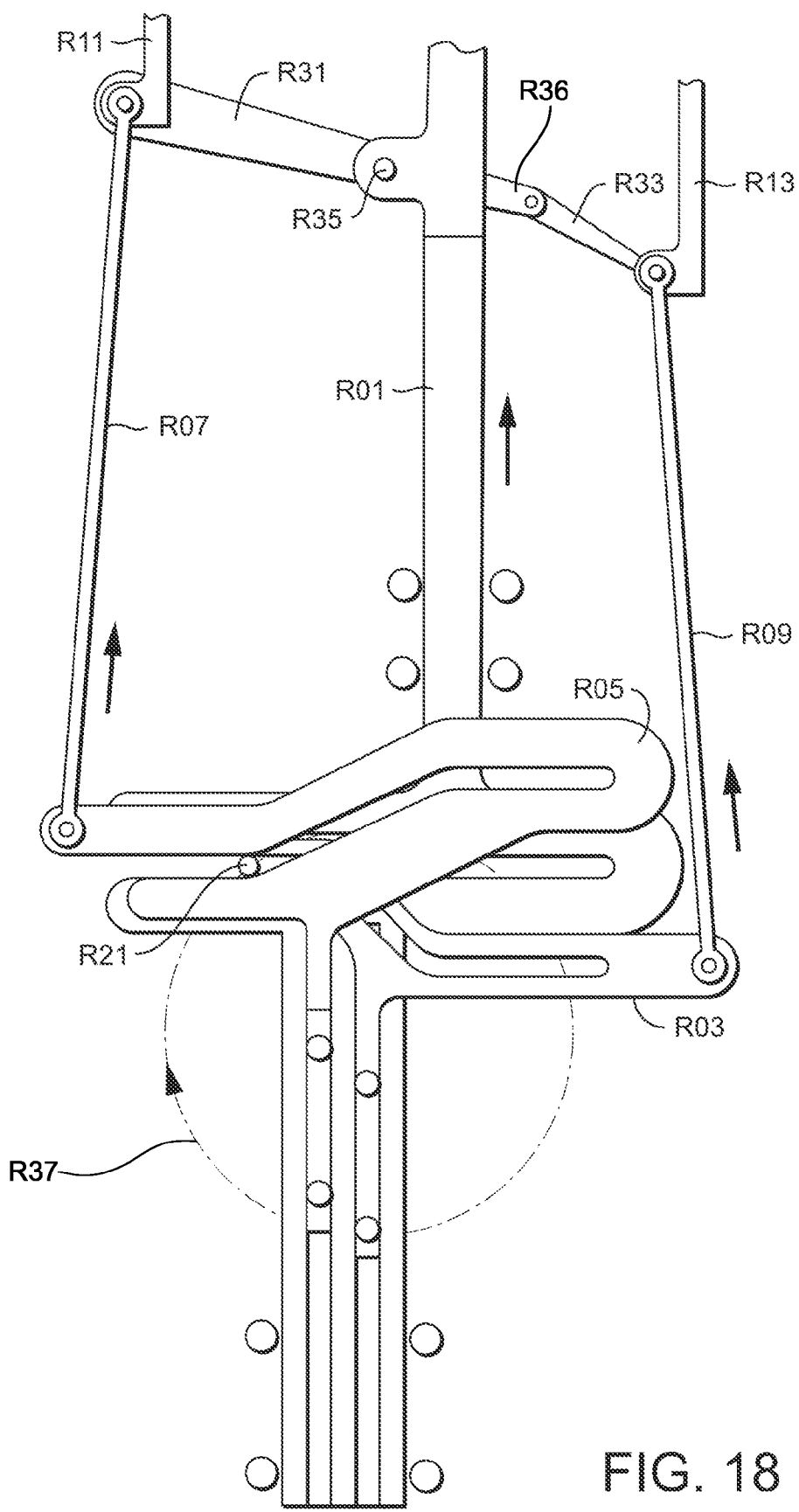
FIG. 18 depicts a means for achieving all-mechanical control of articulated airfoils.

In the case of a rigid blade with a single articulation, as shown in FIG. 18, it is necessary to provide a second joint R36, or "articulation joint" to provide the articulation. The blade itself, shown in cross section in this figure, comprises a forward section R31, and a rear section R33. The tilt angle of the forward section is controlled by the articulation tilt rod R07, which tilts the forward section R31, while the main tilt rod R09, moves the rear section R33, as in the non-articulated version which appears in FIG. 1.

For each pair of blades, it will be necessary to push upwards on the articulation joint of the upper blade, and downward on the articulation joint of the lower blade.

Still referring to FIG. 18 it may now be understood how the embodiments described above for controlling the tilts of reciprocating interleaved arrays of airfoils can readily be augmented to control the articulation of airfoils having pivot points near mid chord. This implementation is best understood by comparing FIG. 18 with FIG. 6. In this present embodiment the thrust section of the Scotch yoke R01 hosts two sliders rather than, as in FIG. 6. The tilts of the two airfoil sections comprising the articulated airfoil are determined by the heights of the Polish Yokes R03, R05 relative to the height of the Scotch Yoke R01, heights which are all defined by the rotation angle of the shared orbiting crank pin R21. The orbit itself appears as R37 Rods R07, R09 connect R03, R05 to the leading and trailing edges of the articulated airfoil. Because the pivot point joining the two portions of the airfoil is near center chord the overall vertical thrust imparted by wind is shared significantly with rods R07, R09. Nevertheless, because all three yokes couple to the crankshaft via the single crankpin R21, the entirety of the vertical thrust forces acts upon the crankshaft. At the instant shown in FIG. 18 the three thrusts are upwardly directed and contribute to the clockwise orbit of the crankpin.

In alternative embodiments a motor or linear motor can be used to activate the articulation tilt rod, in the same manner as in the embodiment shown in FIG. 1.

Referring to FIG. 19 the time progression of the movement of the articulated airfoils are shown. This figure is analogous to FIG. 3, except that the blades in FIG. 19 are articulated airfoils, the relationship between the forward sections and rear sections changing as the progression proceeds. The articulated airfoils in this figure are represented by straight lines, representing the center lines of the articulated airfoils.

In this figure the leftmost column, column 1, illustrates the two airfoil arrays at one extremum of the stroke. Wind is incident from the left, represented by the horizontal arrow. In column 2 the leading edges have moved to catch wind while the trailing edges deflect the wind even further. The directions of thrust are indicated by the vertical arrows in this figure. Column 3 illustrates the disposition of the articulated airfoil sections later in the stroke. Column 4 shows the airfoils momentarily at rest at the end of the first stroke. The second stroke begins with the configuration shown in Col. 5.

As previously indicated, the airfoils in this embodiment can be described as "flying", since the thrust forces involved correspond to the lift of an airfoil in accordance with Bernoulli's principles, rather than exhibiting trap and release behavior. Review of the NACA wing performance data base shows that articulating the airfoils in this fashion will typically exhibit more than double the peak lift one would obtain with a similar sized symmetric single-piece blade.

Figure 20:
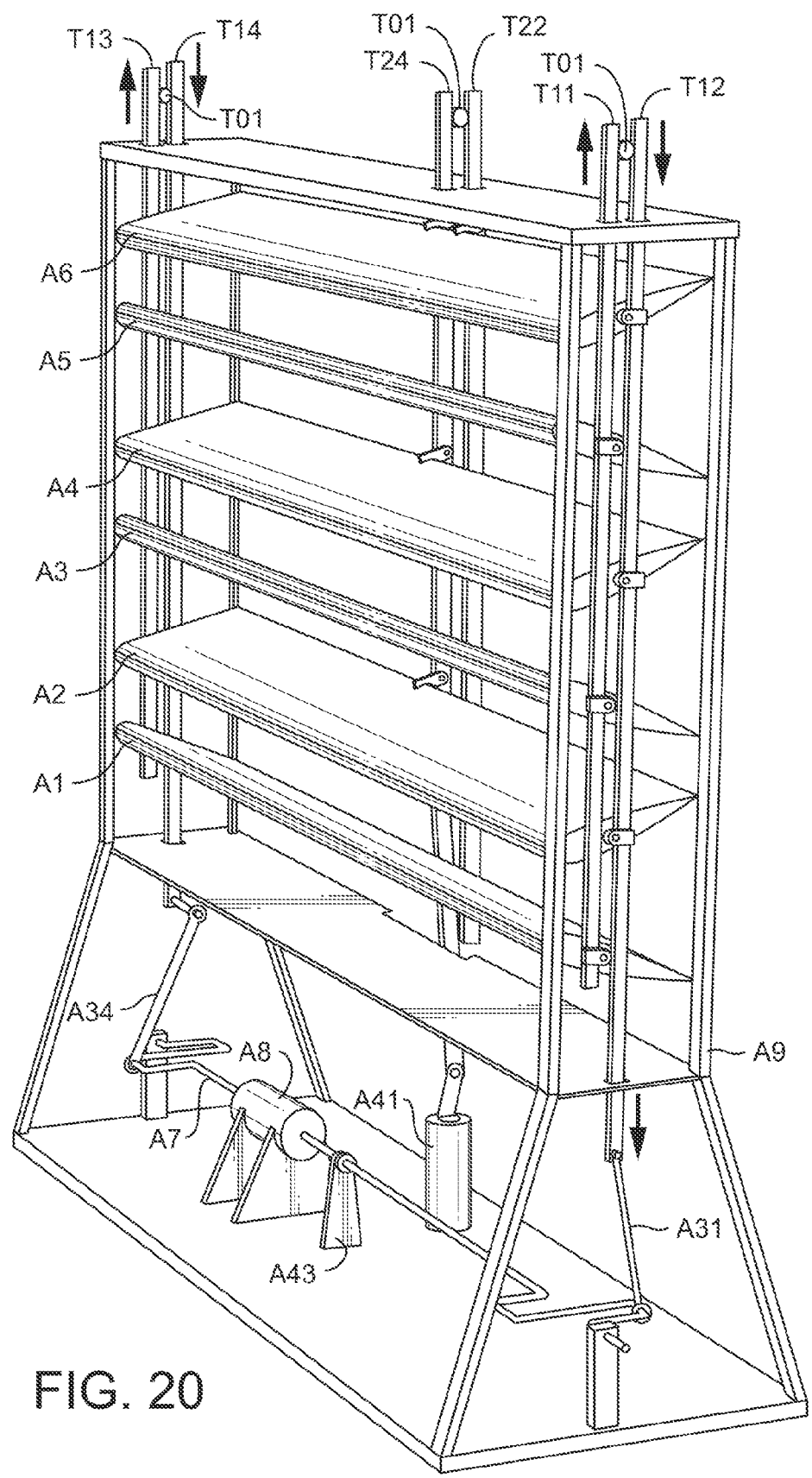
FIG. 20 depicts an alternative embodiment of the device in which the upward and downward driven thrust rods are connected at the top by a rack and pinion mechanism, and the tilt rods are likewise connected at the top by a rack and pinion mechanism.

Finally, an alternative embodiment to that shown in FIG. 1 is depicted in FIG. 20. This embodiment is a modified form of the device of FIG. 1, in that the number of couplings A31, A34 of the thrust rods T11-T14 to the crankshaft are reduced from two to one, as are the number of couplings A31 of the tilt rods T24 to the linear motor.

Figure 20A:
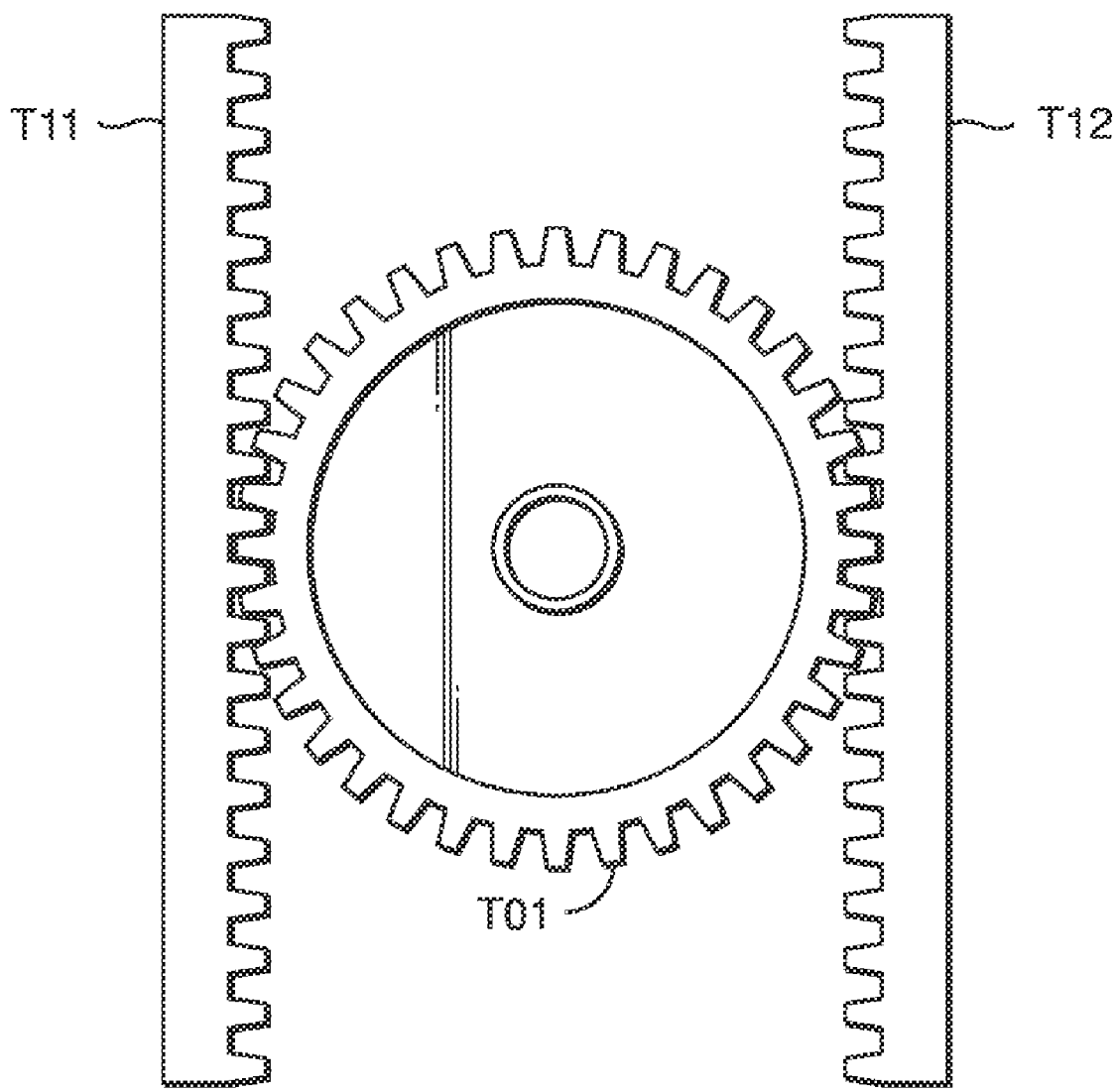
FIG. 20A depicts a detail of the rack and pinion mechanism of the tilt rods T11 and T12 which appear in FIG. 20.

The thrust rods of FIG. 1 are affixed to the ends of the blades, with an up and down pair at each end. In the embodiment of FIG. 20, in contrast, each pair is connected at the top by a rack and pinion mechanism. Thus, in the case of the pair of thrust rods A11 and A12 of FIG. 1, this thrust rod pair morphs into the pair T11 and T12, the racks, with the pinion T01 connecting the two thrust rods at their top, as shown in the detail of FIG. 20A. The top of rods T11 and T12 have teeth matingly engaged with the pinion at the rod insides, as shown in this detail figure. The thrust rods at the opposing ends of the blades, T13 and T14, have been modified in the same way, being linked by a pinion mated to the upper ends of the rods through teeth at said upper ends. Thus, the toothed rods at either side of the pinion connecting rods T13 and T14 form a double rack and pinion.

In operation, the odd-numbered thrust rods, T11 and T13, will be driven up and down during the operation of the device. This motion will be transmitted to the even-numbered rods through the pinion gears. Thus, all of the force of the blade excursions will be transmitted to the even-numbered thrust rods and thus to the crankshaft. Accordingly, it is not necessary to link the bottom end of thrust rods T12 and T14 to the crankshaft. This embodiment provides a simplified means to transform the linear motion of the blades to the rotary motion of the crankshaft, and reduces the number of moving parts required as a result.

This same approach is used in the linking of the tilt mechanism to the blades in the present embodiment. The tilt rods of FIG. 1 have been replaced in FIG. 20 by the pair T21 and T22, which also form a rack and pinion pair at the top of the exoskeleton, and allow the tilt to be controlled by a single tilt rod T24. Furthermore, this embodiment requires only a single linear motor to provide tilt control, as will be apparent from the configuration shown in FIG. 20.

Various combinations of features of the embodiments described herein can be incorporated into yet other variations of those embodiments, depending upon the applications in which these embodiments are intended.

While the present system has been described in detail and with reference to specific embodiments thereof, it will be apparent to one skilled in the art that various changes and modifications can be made therein without departing from the spirit and scope thereof.

I claim:

1. A reciprocating transducer powered by the kinetic energy of fluids, comprising:
one or more upward thrust members;
one or more downward thrust members; and
an array of blades, moveable relative to each other in response to motion of the fluid, the array comprising:
(a) a first configuration of the array, comprising a plurality of the blades ordered in a first grouping of pairs, in which the blades of each pair are driven apart from each other by the motion of the fluid, thereby creating a first linear excursion of the upward thrust members in an upward direction; and
(b) a second configuration of the array, comprising a plurality of the blades ordered in a second grouping of pairs, in which the blades of each pair are driven apart from each other by the motion of the fluid, thereby creating a second linear excursion of the downward thrust members in a downward direction,
the transducer further comprising means for configuring the array alternatingly between the first and the second configurations,
so that the linear excursions of the thrust members alternate between motion in upward and downward directions at a constant frequency for a given velocity of the fluid.

2. The reciprocating transducer of claim 1, further comprising means to convert the linear excursions of the upward and downward thrust members into rotary motion.

3. The reciprocating transducer of claim 2, further comprising an electrical generator, coupled to said rotary motion, and generating electrical power thereby.

4. The reciprocating transducer of claim 3, wherein the means to convert the linear excursions into rotary motion further comprises a crankshaft.

5. The reciprocating transducer of claim 3, wherein the means to convert the linear excursions into rotary motion further comprises one or more Scotch Yokes.

6. The reciprocating transducer of claim 3, wherein the means to convert the linear excursions into rotary motion further comprises one or more Polish Yokes.

7. The reciprocating transducer of claim 4 or 5 or 6, wherein the fluid comprises air.

8. The reciprocating transducer of claim 4 or 5 or 6, wherein the fluid comprises water.

9. The reciprocating transducer of claim 5 or 6, wherein the array of blades further comprises:
(a) a plurality of odd numbered blades that comprise an odd sub-array; and
(b) a plurality of even numbered blades that comprise an even sub-array,
and wherein:
The upward thrust members comprise one or more odd thrust rods pivotably coupled to the ends of each of the odd numbered blades; and
The downward thrust members comprise one or more even thrust rods pivotably coupled to the ends of each of the even numbered blades.

10. The reciprocating transducer of claim 9, wherein the means for configuring the array alternatingly between the first and the second configurations further comprises
(a) one or more odd tilt rod pivotably coupled to the trailing edge of each of the odd numbered blades;
(b) one or more even tilt rod pivotably coupled to the trailing edge of each of the even numbered blades; and
(c) means to move the tilt rods up and down, thereby changing the attitude of the blades.

11. The reciprocating transducer of claim 10, further comprising a plurality of connecting rods, each having an upper and lower end, wherein each connecting rod is rotatingly affixed at its upper end to a lower end of a corresponding thrust rod, and is rotatingly affixed at its lower end to a corresponding crank throw.

12. The reciprocating transducer of claim 11, wherein the means for moving each of the tilt rods up and down comprises linear motor means.

13. The reciprocating transducer of claim 11, wherein the means for moving each of the tilt rods up and down comprises cam means.

14. The reciprocating transducer of claim 3, wherein the blades comprise articulated airfoils.

15. The reciprocating transducer of claim 7, where each articulated airfoil further comprises a forward section, an articulation joint, and a rear section, and further comprising tilt means for tilting the forward section, and tilt means to tilt the rear section to produce the articulated airfoil shape.

16. A reciprocating transducer powered by the kinetic energy of fluids, comprising:
(a) an array of interleaved blades, comprising a first set of blades and a second set of blades, wherein each member of the first set is disposed between two members of the second set;
(b) means for tilting the blades to a first position, so that, during a first stroke of the transducer, a leading edge of each blade of the first set is tilted upward away from a leading edge of each blade of the second set, which is tilted downward, so that a passage of the fluid causes the blades of the first set to linearly rise and the blades of the second set to linearly fall; and (c) means for tilting the blades to a second position so that, during a second stroke of the transducer, the leading edge of each blade of the second set is tilted upward away from the leading edge of each blade of the first set, which is tilted downward, so that the passage of the fluid causes the blades of the second set to linearly rise and the blades of the first set to linearly fall, creating linear excursions thereby, so that, at the end of the second stroke the blades are in the same configuration as they were at the beginning of the first stroke, alternating said first stroke and said second stroke of the transducer repeatedly at a constant, controlled, synchronized rate, the device further comprising means for converting the linear excursions of the blades into electrical energy.

17. The reciprocating transducer of claim 16, further comprising:

(a) one or more first thrust rods, each rotatably affixed to each blade of the first set; and (b) one or more second thrust rods, each rotatably affixed to each blade of the second set, wherein the thrust rods are rotatingly affixed to throws of a crankshaft.

18. The reciprocating transducer of claim 17, whereby the blades are airfoils capable of creating lift as a result of fluids flowing over their surfaces, and the angles at which they are tilted provides Bernoulli-effect forces which drive apart those blades whose leading edges are tilted away from the leading edges of adjacent blades.

19. The reciprocating transducer of claim 18, further comprising an electrical generator, coupled to a rotary motion, and generating electrical power thereby.

20. The reciprocating transducer of claim 18, wherein the means to convert the linear excursions into rotary motion further comprises one or more Scotch Yokes.

21. The reciprocating transducer of claim 18, wherein the means to convert the linear excursions into rotary motion further comprises one or more Polish Yokes.

* * * * *